(12) United States Patent
Fujiwara et al.

(10) Patent No.: US 11,730,221 B2
(45) Date of Patent: Aug. 22, 2023

(54) APPARATUS FOR DETECTING WEARING OF BODY PROTECTION GEAR

(71) Applicant: HERUTU ELECTRONICS CORPORATION, Shizuoka (JP)

(72) Inventors: Yuya Fujiwara, Shizuoka (JP); Shinichi Okada, Shizuoka (JP)

(73) Assignee: HERUTU ELECTRONICS CORPORATION, Shizuoka (JP)

( * ) Notice: Subject to any disclaimer, the term of this patent is extended or adjusted under 35 U.S.C. 154(b) by 133 days.

(21) Appl. No.: 17/058,158

(22) PCT Filed: Jan. 9, 2020

(86) PCT No.: PCT/JP2020/000520
§ 371 (c)(1),
(2) Date: Nov. 24, 2020

(87) PCT Pub. No.: WO2020/145362
PCT Pub. Date: Jul. 16, 2020

(65) Prior Publication Data
US 2021/0361018 A1 Nov. 25, 2021

(30) Foreign Application Priority Data

Jan. 12, 2019 (JP) ................................ 2019-003921

(51) Int. Cl.
*A42B 3/04* (2006.01)
*A42B 3/08* (2006.01)
(Continued)

(52) U.S. Cl.
CPC .......... *A42B 3/0466* (2013.01); *A42B 3/0453* (2013.01); *A42B 3/08* (2013.01); *G05B 19/048* (2013.01); *G08B 21/0438* (2013.01)

(58) Field of Classification Search
CPC ....... A42B 3/0466; A42B 3/0453; A42B 3/08; G05B 19/048; G08B 21/0438
(Continued)

(56) References Cited

U.S. PATENT DOCUMENTS 6,003,156 A * 12/1999 Anderson ............ A42B 3/0466
340/432
6,157,298 A * 12/2000 Garfinkel ............. A42B 3/0466
340/463
(Continued)

FOREIGN PATENT DOCUMENTS

EP 0285938 A1 10/1988
JP 10-115307 A 5/1998
(Continued)

OTHER PUBLICATIONS

International Search Report (ISR) dated Apr. 7, 2020 filed in PCT/JP2020/000520.

*Primary Examiner* — Zhen Y Wu
(74) *Attorney, Agent, or Firm* — Rankin, Hill & Clark LLP

(57) ABSTRACT

A personal protective equipment wearing detection apparatus is provided which can accurately detect the approach or contact of a person's head by use of a plurality of contact detection sensors. A personal protective equipment wearing detection apparatus 100 includes a headband contact detection sensor 110 and a chin strap contact detection sensor 120, which are mounted on a headband 92 and a chin strap 94 of a helmet 90, respectively. The headband contact detection sensor 110 and the chin strap contact detection sensor 120 are connected to a controller 103 of a detection apparatus body 101. While one of the two contact detection sensors, the headband contact detection sensor 110 and the chin strap contact detection sensor 120, outputs a contact detection
(Continued)

signal to the controller 103, the controller 103 connects the other contact detection sensor to GND.

15 Claims, 11 Drawing Sheets

(51) Int. Cl.
*G05B 19/048* (2006.01)
*G08B 21/04* (2006.01)

(58) Field of Classification Search
USPC .................................................. 340/539.22
See application file for complete search history.

(56) References Cited

U.S. PATENT DOCUMENTS

| | | | | |
|---|---|---|---|---|
| 9,035,776 B2* | 5/2015 | Miller, II | ............... | A61B 5/11 |
| | | | | 340/10.2 |
| 9,550,418 B1* | 1/2017 | Logan | ............... | H04W 4/80 |
| 9,848,666 B1* | 12/2017 | Egeland | ............... | A42B 3/0466 |
| 2008/0256687 A1* | 10/2008 | Spencer | ............... | A42B 3/046 |
| | | | | 340/669 |
| 2012/0092028 A1* | 4/2012 | Lee | ............... | G06F 3/0446 |
| | | | | 324/658 |
| 2012/0191397 A1* | 7/2012 | Eatwell | ............... | A61B 5/6803 |
| | | | | 73/1.79 |
| 2013/0118255 A1* | 5/2013 | Callsen | ............... | A42B 3/046 |
| | | | | 73/491 |
| 2014/0115759 A1* | 5/2014 | Tomlin | ............... | A63B 71/10 |
| | | | | 340/689 |
| 2014/0208486 A1* | 7/2014 | Krueger | ............... | A42B 3/064 |
| | | | | 2/414 |
| 2014/0267153 A1* | 9/2014 | Heim | ............... | G06F 3/0213 |
| | | | | 345/174 |
| 2015/0046116 A1* | 2/2015 | Eatwell | ............... | G01L 5/0052 |
| | | | | 702/150 |
| 2015/0305426 A1* | 10/2015 | Lee | ............... | A42B 3/046 |
| | | | | 340/539.12 |
| 2016/0026315 A1* | 1/2016 | Choi | ............... | G06F 3/0445 |
| | | | | 345/174 |
| 2016/0073722 A1* | 3/2016 | Eustace | ............... | A42B 3/0466 |
| | | | | 340/539.13 |
| 2016/0292520 A1* | 10/2016 | Takahashi | ............... | G06V 40/20 |
| 2016/0335872 A1* | 11/2016 | Kozloski | ............... | A61B 5/742 |
| 2017/0068383 A1* | 3/2017 | Chern | ............... | G06F 3/044 |
| 2017/0136875 A1* | 5/2017 | Logan | ............... | H04W 4/80 |
| 2017/0192612 A1* | 7/2017 | Shinya | ............... | G06F 3/0446 |
| 2017/0273386 A1* | 9/2017 | Kuo | ............... | A42B 3/0466 |
| 2017/0344141 A1* | 11/2017 | Lee | ............... | G06F 3/0446 |
| 2018/0007994 A1* | 1/2018 | Boesen | ............... | A42B 3/30 |
| 2018/0056797 A1* | 3/2018 | Cao | ............... | H01R 13/641 |
| 2019/0320978 A1* | 10/2019 | Lee | ............... | A61B 5/375 |

FOREIGN PATENT DOCUMENTS

| | | |
|---|---|---|
| JP | 2007-16342 A | 1/2007 |
| JP | 2008-38279 A | 2/2008 |
| JP | 2015-17989 A | 1/2015 |
| KR | 10-0902778 B1 | 6/2009 |
| KR | 10-2010-0114723 A | 10/2010 |
| WO | 2007/083329 A1 | 7/2007 |

* cited by examiner

APPARATUS FOR DETECTING WEARING OF BODY PROTECTION GEAR

TECHNICAL FIELD

The present invention relates to a personal protective equipment wearing detection apparatus that detects whether or not personal protective equipment such as a helmet is worn on the body such as the head.

BACKGROUND ART

Conventionally, there is a helmet wearing detection apparatus that detects whether or not a helmet is appropriately worn on a person's head. For example, a helmet disclosed in Patent Literature 1 below is equipped with a helmet wearing detection apparatus that includes one or more capacitive sensors and can detect the approach of a person's head.

CITATION LIST

Patent Literature

PATENT LITERATURE 1: JP-A-2015-17989

However, in Patent Literature 1 above, a specific configuration that includes two or more capacitive sensors and detects the approach of a person's head is not disclosed. There is a problem that it is not clear how a plurality of contact detection sensors is used to detect the approach or contact of a person's head.

SUMMARY OF INVENTION

The present invention addresses the above mentioned problem. An object of the present invention is to provide a personal protective equipment wearing detection apparatus that can accurately detect the approach or contact of a person's body by use of a plurality of contact detection sensors.

In order to achieve the object, the present invention features a personal protective equipment wearing detection apparatus that is attached to personal protective equipment to be mounted on and protect a person's body and detects a wearing state of the personal protective equipment on the body. The personal protective equipment wearing detection apparatus comprises: a plurality of contact detection sensors to be attached at a plurality of different positions on the personal protective equipment, the plurality of contact detection sensors being configured to output contact detection signals being electrical signals in accordance with the approach or contact of the body; and a controller connected to the plurality of contact detection sensors, into which the contact detection signals are inputted, wherein in the plurality of contact detection sensors, while one of the plurality of contact detection sensors outputs the contact detection signal to the controller, the remaining contact detection sensors are connected to GND.

According to the feature of the present invention configured in this manner, in the personal protective equipment wearing detection apparatus, while one of the plurality of contact detection sensors outputs the contact detection signal to the controller, the remaining contact detection sensors are connected to GND. Hence, the contact detection signal to be inputted into the controller can be stabilized. Hence, the accuracy of detecting the approach or contact of the person's body can be improved.

The present invention also features the personal protective equipment wearing detection apparatus including the controller connecting, while receiving input of the contact detection signal from one of the plurality of contact detection sensors, the remaining contact detection sensors to GND.

According to the other feature of the present invention configured in this manner, in the personal protective equipment wearing detection apparatus, while receiving input of the contact detection signal from one of the plurality of contact detection sensors, the controller connects the remaining contact detection sensors to GND. Hence, the contact detection signal to be inputted into the controller can be stabilized with a simple configuration. In other words, the controller receives the input of the contact detection signal from each of the plurality of contact detection sensors, one by one, and connects, to GND, the contact detection sensors other than the contact detection sensor inputting the contact detection signal. Consequently, the contact detection signal to be inputted into the controller can be stabilized.

In this case, in the personal protective equipment wearing detection apparatus, it is also possible to stabilize the contact detection signal to be inputted into the controller by providing a pull-down resistor between the contact detection sensor and GND instead of, or in addition to, control of switching to GND by the controller.

The present invention also features the personal protective equipment wearing detection apparatus further including a wearing determiner configured to determine the wearing state of the personal protective equipment on the body by use of the contact detection signals inputted into the controller from the plurality of contact detection sensors, wherein the wearing determiner determines that the personal protective equipment is worn on the body upon two or more of the plurality of contact detection sensors having detected the worn state of the personal protective equipment on the body.

According to the other feature of the present invention configured in this manner, in the personal protective equipment wearing detection apparatus, the wearing determiner determines that the personal protective equipment is worn on the body when two or more of the plurality of contact detection sensors have detected the worn state of the personal protective equipment on the body. Hence, it is possible to improve the determination accuracy as compared to a case of determining the wearing state on the basis of one contact detection sensor.

The present invention features a personal protective equipment wearing detection apparatus that detects a wearing state of personal protective equipment on a person's body, the personal protective equipment being worn on and protecting the body, the personal protective equipment wearing detection apparatus comprising: a plurality of contact detection sensors to be attached at a plurality of different positions on the personal protective equipment, the plurality of contact detection sensors being configured to output contact detection signals being electrical signals in accordance with the approach or contact of the body; a controller connected to the plurality of contact detection sensors, into which the contact detection signals are inputted; and a wearing determiner configured to determine the wearing state of the personal protective equipment on the body by use of the contact detection signals inputted into the controller, wherein the wearing determiner determines that the personal protective equipment is worn on the body upon at least two of the plurality of contact detection sensors having detected the worn state of the personal protective equipment on the body.

According to the feature of the present invention configured in this manner, in the personal protective equipment wearing detection apparatus, the wearing determiner determines that the personal protective equipment is worn on the body when two or more of the plurality of contact detection sensors have detected the worn state of the personal protective equipment on the body. Hence, it is possible to accurately detect the approach or contact of the person's body by use of the plurality of contact detection sensors. Hence, it is also possible to improve the determination accuracy as compared to the case of determining the wearing state on the basis of one contact detection sensor.

The present invention also features the personal protective equipment wearing detection apparatus, wherein the personal protective equipment is a helmet, and the plurality of contact detection sensors includes a chin strap contact detection sensor to be mounted on a chin strap of the helmet, and a headband contact detection sensor to be mounted on a headband of the helmet.

According to the other feature of the present invention configured in this manner, in the personal protective equipment wearing detection apparatus, the plurality of contact detection sensors include the chin strap contact detection sensor to be mounted on the chin strap of the helmet, and the headband contact detection sensor to be mounted on the headband of the helmet. Hence, it is possible to more accurately detect the wearing state of the helmet.

The present invention also features the personal protective equipment wearing detection apparatus, the personal protective equipment is a helmet, and the plurality of contact detection sensors includes a plurality of headband contact detection sensors to be mounted at a plurality of positions on a headband of the helmet. Hence, it is possible to accurately detect the wearing state of the helmet. In this case, the plurality of headband contact detection sensors may be placed on the front and back and/or the left and right of the head. Moreover, the helmet wearing detection apparatus may include a chin strap contact detection sensor to be mounted on a chin strap of the helmet, in addition to the headband contact detection sensors.

The present invention also features the personal protective equipment wearing detection apparatus including a determination result storage configured to store a determination result by the wearing determiner; and a host apparatus provided at a place physically away from the wearing determiner, into which the determination result by the wearing determiner is inputted, wherein the controller includes the determination result storage and the wearing determiner, and compares the determination result by the wearing determiner and a previous determination result stored in the determination result storage and, upon both of the determination results being different, outputs the determination result determined this time to the host apparatus.

According to the other feature of the present invention configured in this manner, in the personal protective equipment wearing detection apparatus, the controller includes the determination result storage and the wearing determiner, and compares the determination result by the wearing determiner and the previous determination result stored in the determination result storage and, when both of the determination results are different, outputs the determination result determined this time to the host apparatus. Hence, it is possible to reduce the frequency of the output of the determination result to the host apparatus and to reduce power consumption.

The present invention also features the personal protective equipment wearing detection apparatus, wherein the controller measures time elapsed since the transmission of the determination result to the host apparatus as output elapsed time, and compares the determination result by the wearing determiner and the previous determination result stored in the determination result storage and, upon both of the determination results agreeing with each other and the output elapsed time reaching a predetermined period of time, outputs the determination result determined this time to the host apparatus.

According to the other feature of the present invention configured in this manner, in the personal protective equipment wearing detection apparatus, the controller measures the time elapsed since the transmission of the determination result to the host apparatus as the output elapsed time, and compares the determination result by the wearing determiner and the previous determination result stored in the determination result storage and, when both of the determination results agree with each other, and the output elapsed time reaches the predetermined period of time, outputs the determination result determined this time to the host apparatus. Consequently, in the personal protective equipment wearing detection apparatus, it is possible to cause the host apparatus to confirm that the wearing state continues to be appropriately determined even when the controller does not output the wearing state to the host apparatus for more than the predetermined period of time. Moreover, in the personal protective equipment wearing detection apparatus, it is possible for the controller to cause the host apparatus to confirm that the controller is present within a coverage area if the controller outputs the wearing state of the personal protective equipment to the host apparatus by wireless communication.

The present invention also features the personal protective equipment wearing detection apparatus, wherein the controller enters and keeps a sleep state for a predetermined period of time whenever the wearing determiner performs the determination process once, or two or more times.

According to the other feature of the present invention configured in this manner, in the personal protective equipment wearing detection apparatus, the controller enters and keeps the sleep state for the predetermined period of time whenever the wearing determiner performs the determination process once, or two or more times. Hence, it is possible to reduce the frequency of the execution of the determination process by the wearing determiner and to reduce power consumption.

In this case, the sleep state of the controller includes a low-speed operation mode that reduces the operating frequency of a CPU, a sleep mode that suspends the execution of an instruction while putting the peripheral functions (such as a USB function, a power monitoring function, and a random number generating function) of the CPU in an executable state, and a low-speed operation sleep mode that reduces the operating frequency of the peripheral functions in the sleep mode state.

The present invention also features the personal protective equipment wearing detection apparatus further including a power supply configured to supply power to the controller without via a power switch, wherein the controller executes the determination process by the wearing determiner automatically, triggered by the supply of the power from the power supply.

According to the other feature of the present invention configured in this manner, in the personal protective equipment wearing detection apparatus, the controller executes the determination process by the wearing determiner automatically, triggered by the supply of the power from the power supply. Hence, it is possible to prevent failing to detect the wearing state of the personal protective equipment due to forgetting turning on the power to the personal protective equipment wearing detection apparatus.

DESCRIPTION OF EMBODIMENTS

Figure 1:
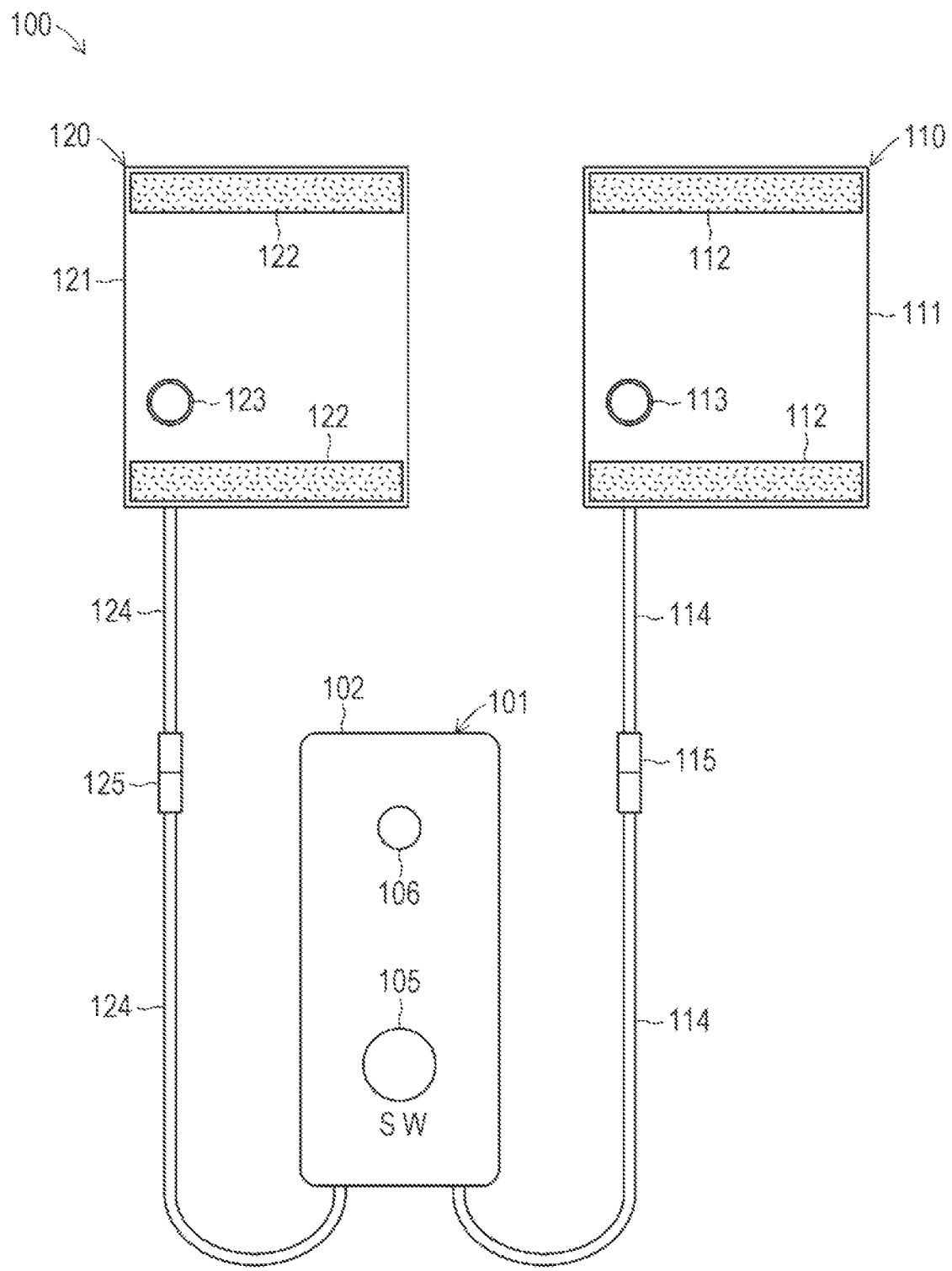
FIG. 1 is a plan view schematically illustrating a rough outline of the external configuration of a personal protective equipment wearing detection apparatus according to the present invention.
Figure 2:
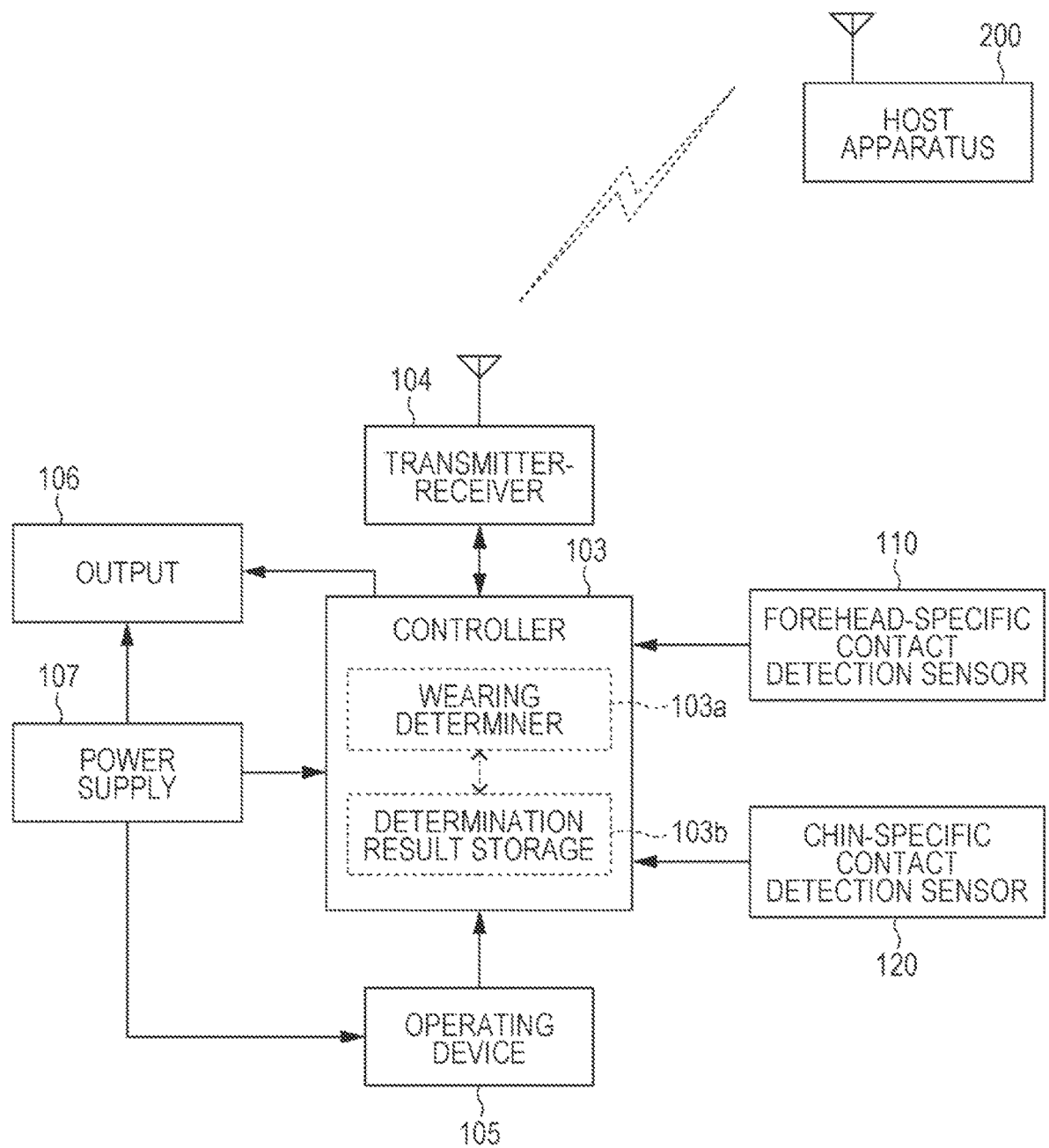
FIG. 2 is a block diagram of a control system for controlling the operation of the personal protective equipment wearing detection apparatus illustrated in FIG. 1.

One embodiment of a personal protective equipment wearing detection apparatus according to the present invention is described hereinafter with reference to the drawings. FIG. 1 is a plan view schematically illustrating a rough outline of the external configuration of a personal protective equipment wearing detection apparatus 100 according to the present invention. Moreover, FIG. 2 is a block diagram of a control system for controlling the operation of the personal protective equipment wearing detection apparatus 100 illustrated in FIG. 1. The drawings referred to in the description are depicted schematically to facilitate the understanding of the present invention. For example, some of constituent elements are exaggerated for illustration purposes. Hence, for example, the dimensions and ratios between the constituent elements may be different. The personal protective equipment wearing detection apparatus 100 is a device for detecting whether or not a worker is wearing a helmet 90 appropriately on a construction site or in a factory.

Figure 3:
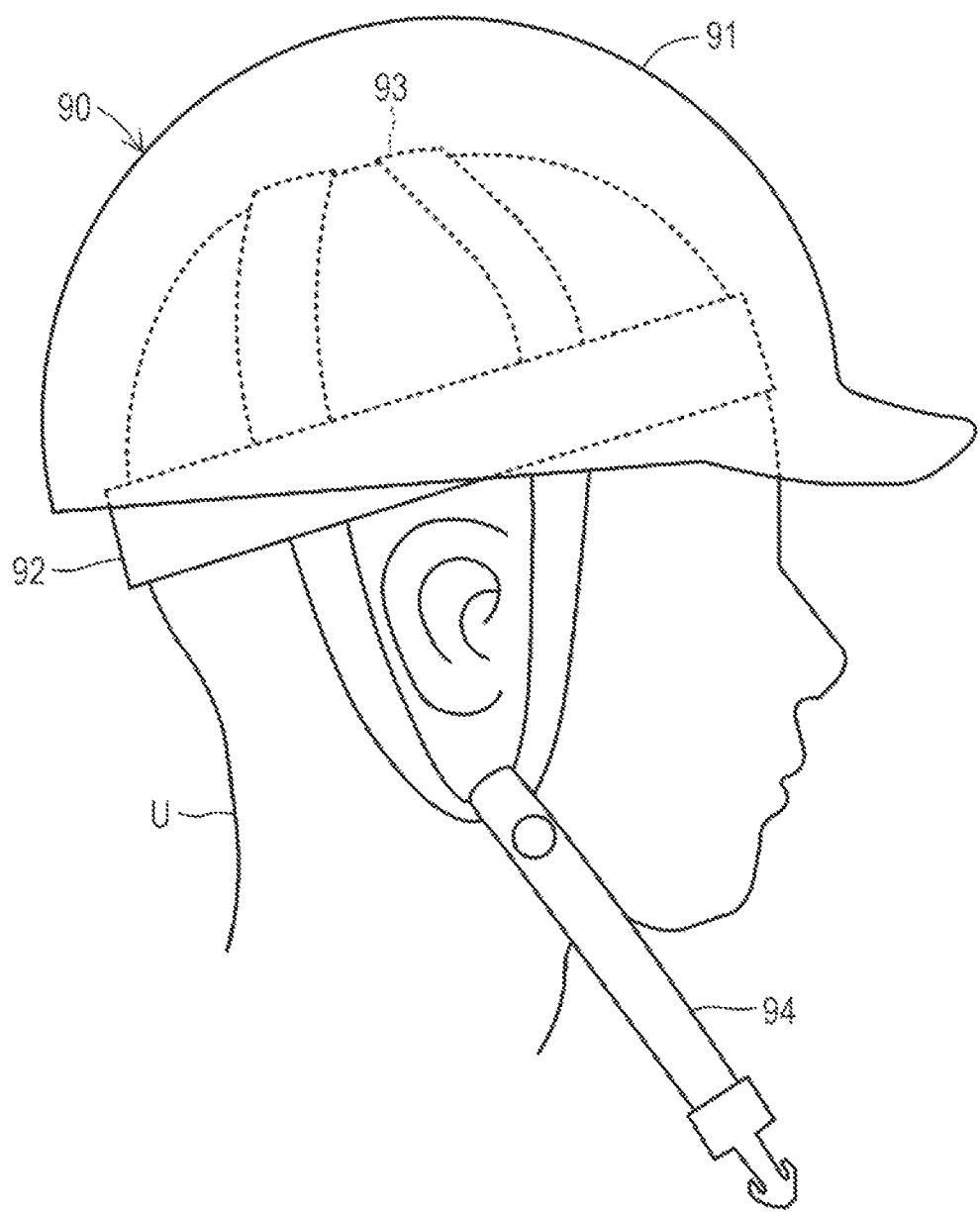
FIG. 3 is a side view schematically illustrating a rough outline of the external configuration of a helmet to which the personal protective equipment wearing detection apparatus illustrated in FIG. 1 is attached.

Firstly, the helmet 90 being a target for mounting the personal protective equipment wearing detection apparatus 100 is described before the personal protective equipment wearing detection apparatus 100 is described. The helmet 90 is a metal or resin hat as illustrated in FIG. 3. The helmet 90 is worn in such a manner as to cover the head of a worker (a user U of the personal protective equipment wearing detection apparatus 100) to protect the head on a construction site or in a factory. The helmet 90 includes a headband 92 and a hammock 93 inside a cup-shaped hat body 91 that houses the head of the user U.

The headband 92 and the hammock 93 are components that support the hat body 91 indirectly on the head while being put on the head of the user U. The headband 92 and the hammock 93 are configured by assembling resin or fabric band members into a hemispheric basket that covers the head. In this case, the headband 92 is formed as a ring-shaped resin band member of a size matching the circumference of the head, and is attached to an inner peripheral surface of the hat body 91.

The headband 92 is provided with the hammock 93 in a state of curving inward in the hat body 91, and provided with a chin strap 94 in a state of hanging down below the hat body 91. The hammock 93 is a component that is placed on the upper part of the head of the user U. The hammock 93 is provided by installing a plurality of the resin or fabric band members in an arc shape that curves in a convex shape in a radial direction of the headband 92.

The chin strap 94 is a component for holding the hat body 91 on the head of the user U by fitting under the chin of the user U wearing the hat body 91 and bringing the headband 92 and the hammock 93 into intimate contact with the head of the user U. The chin strap 94 is configured by forming a resin or fabric material into a cord or band. The chin strap 94 includes an unillustrated length adjustment mechanism and can adjust a fit to the chin. In other words, the helmet 90 is configured as a safety helmet with a general structure, which has conventionally been in wide use.

(Configuration of the Personal Protective Equipment Wearing Detection Apparatus 100)

The personal protective equipment wearing detection apparatus 100 is configured, mainly including a detection apparatus body 101, a headband contact detection sensor 110, and a chin strap contact detection sensor 120. The detection apparatus body 101 is a terminal apparatus that detects a wearing state of the helmet 90 by use of contact detection signals outputted from the headband contact detection sensor 110 and the chin strap contact detection sensor 120, and transmits signals in accordance with detection results to a host apparatus 200 wirelessly (by radio waves). The detection apparatus body 101 is configured, including an electronic board (not illustrated) in a resin housing 102 of approximately a size that fits in the palm of the person's hand, the electronic board configuring a controller 103, a transmitter-receiver 104, an operating device 105, an output 106, and a power supply 107.

The controller 103 is configured with a microcomputer including a CPU, ROM, and RAM. The controller 103 executes a personal protective equipment wearing detection program prestored in a storage device such as ROM and accordingly controls the operation of the entire personal protective equipment wearing detection apparatus 100 and detects the wearing state of the helmet 90. Specifically, the controller 103 includes a wearing determiner 103a and a determination result storage 103b.

The wearing determiner 103a uses the contact detection signals outputted from the headband contact detection sensor 110 and the chin strap contact detection sensor 120 to determine the wearing state of the helmet 90. Moreover, the determination result storage 103b is memory that stores a determination result temporarily to compare the determination results determined by the wearing determiner 103a. The determination result storage 103b is configured with RAM being a storage device where data can be read and write.

Consequently, the controller 103 determines the wearing state of the helmet 90 by use of the contact detection signals outputted from the headband contact detection sensor 110 and the chin strap contact detection sensor 120, and transmits a detection result signal in accordance with the determination result to the host apparatus 200. Moreover, the controller 103 also performs various settings of a communication environment such as pairing with the host apparatus 200.

The transmitter-receiver 104 is an electric circuit that transmits the detection result signal outputted from the controller 103 to the host apparatus 200 via an antenna. Moreover, the transmitter-receiver 104 receives a signal outputted from the host apparatus 200 via an antenna, and outputs the signal to the controller 103.

The operating device 105 is an input device that outputs, to the controller 103, an operation signal in accordance with the manual operation of the personal protective equipment wearing detection apparatus 100 by the user U, and is configured with a press button. The operating device 105 is provided on an outer surface of the housing 102 in an exposed state. The output 106 is a display device that displays the operating state of the controller 103 with blinking light. In the embodiment, the output 106 is configured with one LED light-emitting device (Light Emitting Diode: light-emitting diode) exposed to the outer surface of the housing 102.

The power supply 107 is an electric circuit that includes a battery and supplies power to the controller 103, the transmitter-receiver 104, the operating device 105, and the output 106. In the embodiment, the power supply 107 is configured, including a detachable button cell that outputs DC electrical power of 3 V. In the embodiment, the battery is mounted on the power supply 107; accordingly, the controller 103 starts executing the personal protective equipment wearing detection program automatically to start the process of detecting the wearing state of the helmet 90.

Figure 4:
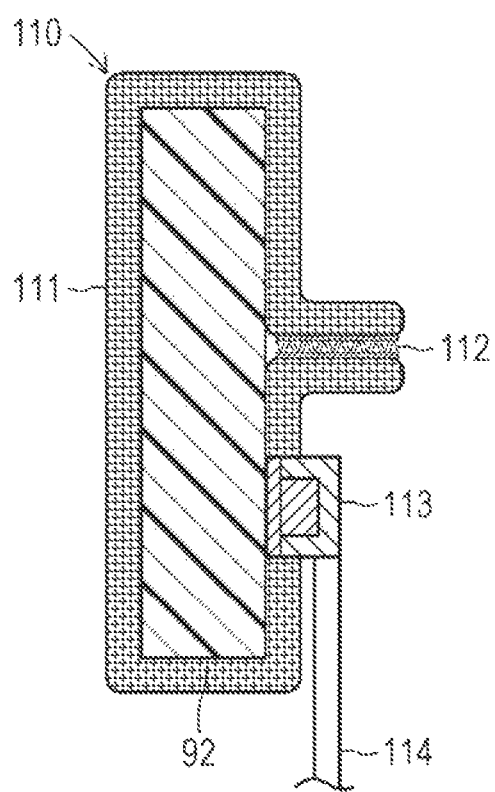
FIG. 4 is a main part cross-sectional view illustrating a state where a headband contact detection sensor illustrated in FIG. 1 has been formed into a tube and wrapped around a headband.

As illustrated in FIG. 4, the headband contact detection sensor 110 is a detector that is detachably attached to the headband 92 of the helmet 90 to detect the approach or contact of the forehead portion of the head of the user U and output a contact detection signal corresponding to the detection. The headband contact detection sensor 110 includes a fabric mounting body 111 made of flexible conductive fabric. More specifically, the fabric mounting body 111 of the headband contact detection sensor 110 is made of woven fabric, knitted fabric, or non-woven fabric, which is formed of conductive fibers.

In this case, the conductive fibers include resin or natural fibers whose surfaces are coated or plated with a conductive metal material such as copper, silver, or nickel. The conductive fibers may be formed by making a mixture of a resin material and conductive metal or carbon into a yarn and then into fabric. Moreover, the fabric mounting body 111 may include only a conductive metal material formed into a sheet, or a conductive rubber sheet or resin film (for example, a resin film with an ITO layer containing an indium tin oxide on the surface). Alternatively, the fabric mounting body 111 can also be formed by covering at least one of the front and back surfaces of the conductive sheet body or film body with resin or natural fibers. Furthermore, the fabric mounting body 111 can also be formed by attaching a conductive rubber sheet or resin film (for example, a resin film with an ITO layer containing an indium tin oxide on the surface) to the surfaces of resin or natural fibers by use of a method such as a double-sided tape, an adhesive, or seaming. In this case, the conductive sheet or film can be formed into as large a size as the fabric mounting body 111, and also can be formed into a size smaller than the fabric mounting body 111 to be provided to a part of the fabric mounting body 111.

The fabric mounting body 111 is formed into a rectangle in plan view. In this case, the long side of the fabric mounting body 111 is formed in such a manner as to be sufficiently long to form a tubular body that can be wrapped at least once around a portion, which faces the forehead portion of the user U, of the headband 92. Furthermore, the short side orthogonal to the long side is formed in such a manner as to be sufficiently long (for example, 2 cm to 10 cm) to face the forehead portion of the user U along the forehead portion. Naturally, as long as the fabric mounting body 111 can be wrapped at least once around the headband 92, and is formed in a shape and size that allows detecting the approach or contact of the forehead of the user U, the fabric mounting body 111 is not limited to the embodiment.

Moreover, the fabric mounting body 111 includes a tubular connector 112 and a first signal wire connector 113. The tubular connector 112 is a component for, when the fabric mounting body 111 is formed into a tube wrapped around the headband 92, detachably connecting two opposing side portions of the fabric mounting body 111 and retaining or unfolding the tubular shape. In the embodiment, the tubular connector 112 is configured with a hook-and-loop fastener extending in a band shape. In this case, a pair of attachment portions of the tubular connector 112 is provided at both ends on an inner surface of the fabric mounting body 111 in the tubular form, respectively. The pair of attachment portions includes an attachment surface having a hook portion and an attachment surface having a loop portion in which the hook portion catches.

The first signal wire connector 113 is a component for electrically and physically connecting or disconnecting the fabric mounting body 111 and a contact detection signal wire 114. The first signal wire connector 113 is made out of a conductive material. In the embodiment, the first signal wire connector 113 is configured with a snap fastener where a convex portion fits into a concave portion detachably. The pair of the convex-side part and the concave-side part of the first signal wire connector 113 is provided to the fabric mounting body 111 and the contact detection signal wire 114, respectively. If a conductive portion is formed only in a part of the fabric mounting body 111, the first signal wire connector 113 is connected to the conductive portion.

The contact detection signal wire 114 is an electrical wire for electrically connecting the fabric mounting body 111 and the controller 103 to transmit, to the controller 103, a contact detection signal outputted from the fabric mounting body 111. The contact detection signal wire 114 is connected at one end to the controller 103, and is provided at the other end (a front end) with the first signal wire connector 113. Moreover, the contact detection signal wire 114 is provided with a second signal wire connector 115.

The second signal wire connector 115 is a component for connecting or disconnecting the contact detection signal wires 114 at some points in the entire contact detection signal wire 114. The second signal wire connector 115 is configured with a cable joint. The cable joint is an electrical component that can connect or disconnect two electrical wires electrically and physically. The cable joint includes a pin-shaped terminal and a tubular terminal into which the pin-shaped terminal fits detachably. The second signal wire connector 115 is provided at a position where, in the length of the entire contact detection signal wire 114, a length on the controller 103 side is greater than a length on the fabric mounting body 111 side.

Figure 5:
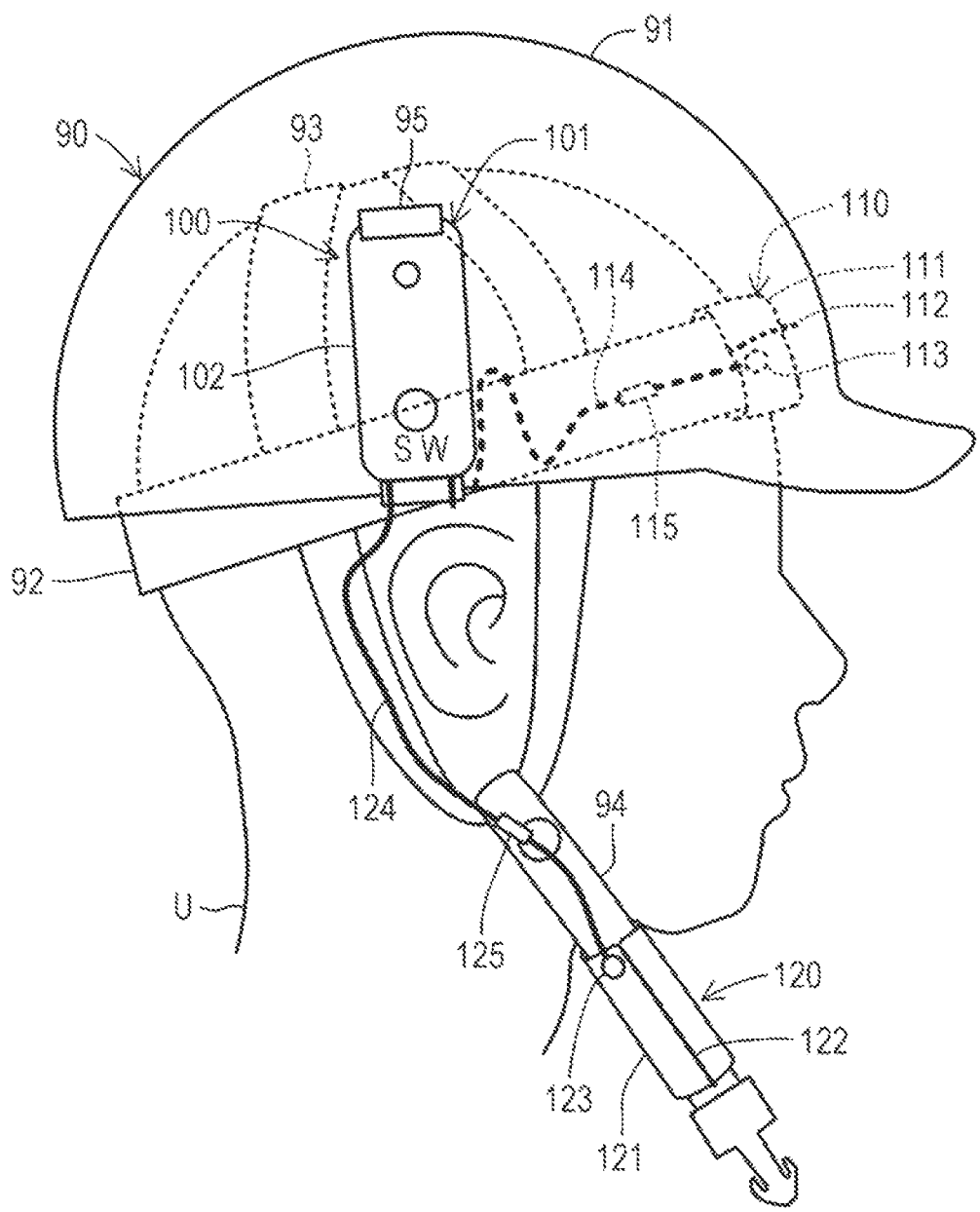
FIG. 5 is a side view schematically illustrating a state before a chin strap of the personal protective equipment wearing detection apparatus illustrated in FIG. 1, which is mounted on the helmet, is fastened.
Figure 6:
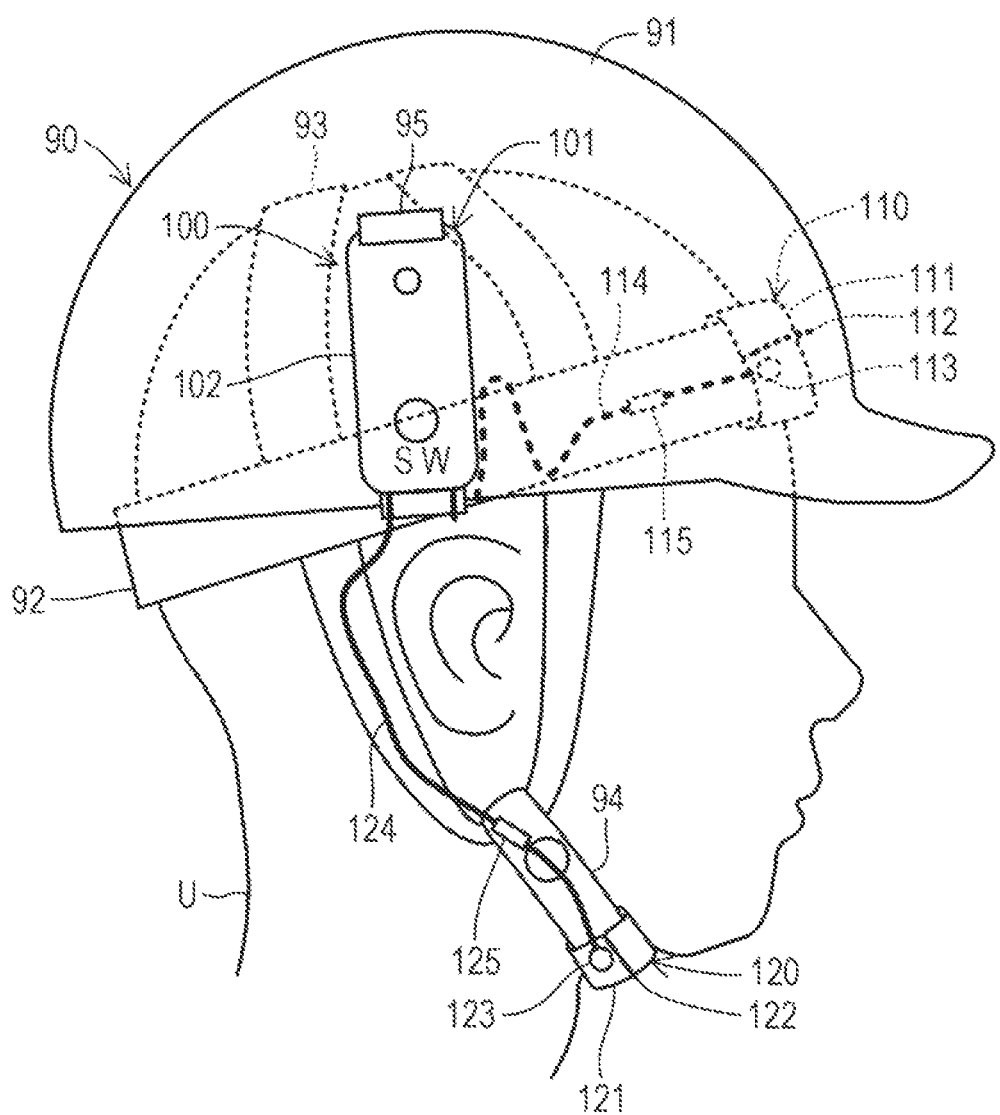
FIG. 6 is a side view schematically illustrating a state where the chin strap of the personal protective equipment wearing detection apparatus illustrated in FIG. 1, which is mounted on the helmet, has been fastened.

As illustrated in FIGS. 5 and 6, the chin strap contact detection sensor 120 is a detector that is detachably attached to the chin strap 94 of the helmet 90 to detect the approach or contact of the chin portion of the head of the user U and output a contact detection signal corresponding to the detection. The chin strap contact detection sensor 120 is formed in like manner with the headband contact detection sensor 110. In other words, the chin strap contact detection sensor 120 includes a fabric mounting body 121 made of flexible conductive fabric as in the fabric mounting body 111.

The fabric mounting body 121 is made of woven fabric, knitted fabric, or non-woven fabric, which is formed of conductive fibers. In this case, the conductive fibers include resin or natural fibers whose surfaces are coated or plated with a conductive metal material such as copper, silver, or nickel. The conductive fibers may be formed by making a mixture of a resin material and conductive metal or carbon into a yarn and then into fabric. Moreover, the fabric mounting body 121 may include only a conductive metal material formed into a sheet, or a conductive rubber sheet or resin film (for example, a resin film with an ITO layer containing an indium tin oxide on the surface). Alternatively, the fabric mounting body 121 can also be formed by covering at least one of the front and back surfaces of the conductive sheet body or film body with resin or natural fibers. Furthermore, the fabric mounting body 121 can also be formed by attaching a conductive rubber sheet or resin film (for example, a resin film with an ITO layer containing an indium tin oxide on the surface) to the surfaces of resin or natural fibers by use of a method such as a double-sided tape, an adhesive, or seaming.

The fabric mounting body 121 is formed into a rectangle in plan view. In this case, the long side of the fabric mounting body 121 is formed in such a manner as to be sufficiently long to form a tubular body that can be wrapped at least once around the chin strap 94. Furthermore, the short side orthogonal to the long side is formed in such a manner as to be sufficiently long (for example, 2 cm to 10 cm) to face the chin portion of the user U. Naturally, as long as the fabric mounting body 121 can be wrapped at least once around the chin strap 94, and is formed in a shape and size that allows detecting the approach or contact of the chin portion of the user U, the fabric mounting body 121 is not limited to the embodiment.

Moreover, the fabric mounting body 121 includes a tubular connector 122 and a first signal wire connector 123. The tubular connector 122 is a component for, when the fabric mounting body 121 is formed into a tube wrapped around the chin strap 94, detachably connecting two opposing side portions of the fabric mounting body 121 and retaining or unfolding the tubular shape. In the embodiment, the tubular connector 122 is configured with a hook-and-loop fastener extending in a band shape. In this case, a pair of attachment portions of the tubular connector 122 is provided at both ends on an inner surface of the fabric mounting body 121 in the tubular form, respectively. The pair of attachment portions includes an attachment surface having a hook portion and an attachment surface having a loop portion in which the hook portion catches.

The first signal wire connector 123 is a component for electrically and physically connecting or disconnecting the fabric mounting body 121 and a contact detection signal wire 124. The first signal wire connector 123 is made out of a conductive material. In the embodiment, the first signal wire connector 123 is configured with a snap fastener where a convex portion fits into a concave portion detachably. The pair of the convex-side part and the concave-side part of the first signal wire connector 123 is provided to the fabric mounting body 121 and the contact detection signal wire 124, respectively.

The contact detection signal wire 124 is an electrical wire for electrically connecting the fabric mounting body 121 and the controller 103 to transmit, to the controller 103, a contact detection signal outputted from the fabric mounting body 121. The contact detection signal wire 124 is connected at one end to the controller 103, and is provided at the other end (a front end) with the first signal wire connector 123. Moreover, the contact detection signal wire 124 is provided with a second signal wire connector 125.

The second signal wire connector 125 is a component for connecting or disconnecting the contact detection signal wires 124 at some points in the entire contact detection signal wire 124. The second signal wire connector 125 is configured with a cable joint. The second signal wire connector 125 is provided at a position where, in the length of the entire contact detection signal wire 124, a length on the controller 103 side is greater than a length on the fabric mounting body 121 side.

The host apparatus 200 is a computer apparatus (for example, a personal computer), and receives a detection result signal transmitted from the detection apparatus body 101 and manages the user U's wearing state of the helmet 90 on which the detection apparatus body 101 is mounted. In the embodiment, the management of the wearing state by the host apparatus 200 is the processes of monitoring and storing the wearing state of the helmet 90 and notifying a manager of the wearing state. Therefore, the host apparatus 200 is placed at a place physically away from the personal protective equipment wearing detection apparatus 100. The host apparatus 200 includes a transceiver for wireless communication with the detection apparatus body 101. In this case, the host apparatus 200 can receive detection result signals from the detection apparatus bodies 101 of a plurality of the personal protective equipment wearing detection apparatuses 100.

(Operation of the Personal Protective Equipment Wearing Detection Apparatus 100)

Next, the operation of the personal protective equipment wearing detection apparatus 100 configured as described above is described. Firstly, the user U has the helmet 90 and the personal protective equipment wearing detection apparatus 100 ready. In this case, in the personal protective equipment wearing detection apparatus 100, a battery is mounted in the detection apparatus body 101, and the process of detecting the wearing state of the helmet 90 based on the execution of the personal protective equipment wearing detection program is under execution.

Next, the user U attaches the personal protective equipment wearing detection apparatus 100 to the helmet 90. Specifically, as illustrated in FIGS. 4 to 6, the user U wraps and attaches the fabric mounting body 111 of the headband contact detection sensor 110 around the headband 92 of the helmet 90. Furthermore, the user U wraps and attaches the chin strap contact detection sensor 120 around the chin strap 94. In this case, the user U forms each of the fabric mounting bodies 111 and 121 into a wrapped tube in a direction where the tubular connectors 112 and 122 are located on outer surfaces, which are opposite to inner surfaces facing the head of the user U, of the headband 92 and the chin strap 94, and affixes each of the fabric mounting bodies 111 and 121 to itself with the tubular connectors 112 and 122. Consequently, the fabric mounting bodies 111 and 121 are attached to the headband 92 and the chin strap 94 in a state where they can be shifted in the circumferential direction and the longitudinal direction (the formation directions of the headband 92 and the chin strap 94), respectively.

Next, the user U attaches the detection apparatus body 101 to the helmet 90. Specifically, the user U has a metal or resin fixture 95 ready, and attaches the detection apparatus body 101 to the hat body 91 of the helmet 90. In this case, the user U can attach the detection apparatus body 101 to a right or left side portion of the hat body 91. The user U may attach the detection apparatus body 101 to a portion other than the side portion of the hat body 91 (for example, a visor portion or back portion of the helmet 90). Alternatively, the user U may attach the detection apparatus body 101 directly to the hat body 91 with a double-sided tape or adhesive without using the fixture 95.

Next, the user U puts on the helmet 90. Specifically, the user U puts the hat body 91 on his/her head and then fastens the chin strap 94. In this case, the user U slides the headband contact detection sensor 110 mounted on the headband 92 and the chin strap contact detection sensor 120 mounted on the chin strap 94 along the headband 92 and the chin strap 94 in such a manner as to place the headband contact detection sensor 110 and the chin strap contact detection sensor 120 on the forehead portion and the chin portion to adjust the positions thereof.

Consequently, the user U can bring the headband contact detection sensor 110 and the chin strap contact detection sensor 120 close to and into contact with the forehead portion and chin portion of the user U, respectively. Moreover, the first signal wire connectors 113 and 123 are each configured with a snap fastener. Hence, the user U can also adjust the position and direction of each of the contact detection signal wires 114 and 124 by rotating the interlocking portions of each snap fastener.

Figure 7:
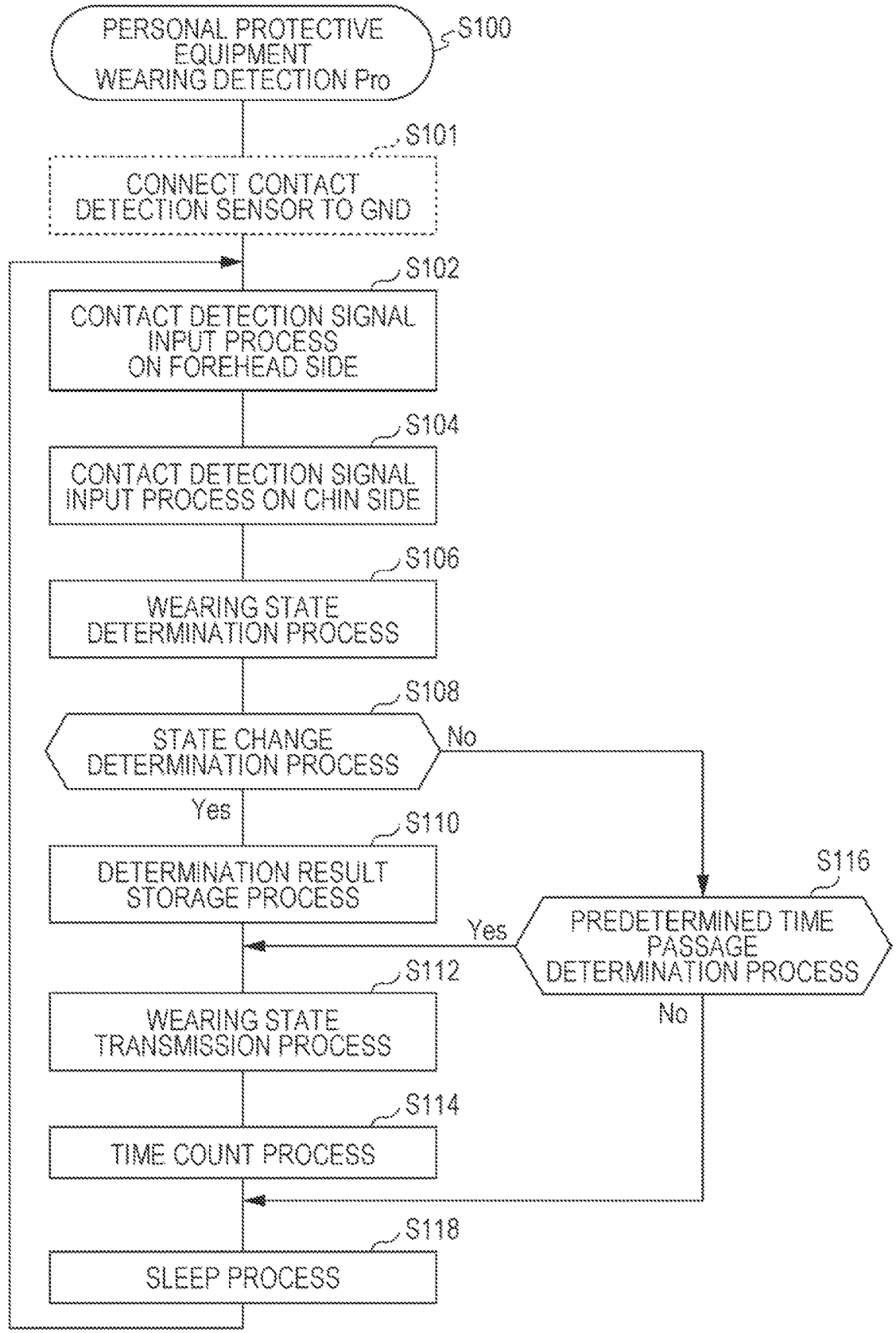
FIG. 7 is a flowchart of a personal protective equipment wearing detection program that is executed by a controller illustrated in FIG. 2.

Consequently, the controller 103 of the personal protective equipment wearing detection apparatus 100 determines the wearing state of the helmet 90 by use of the contact detection signals outputted from the headband contact detection sensor 110 and the chin strap contact detection sensor 120. Furthermore, the controller 103 transmits the determination result to the host apparatus 200. The process of determining the wearing state of the helmet 90 is performed by executing the personal protective equipment wearing detection program illustrated in FIG. 7.

Specifically, the controller 103 starts executing the personal protective equipment wearing detection program in step S100, and executes a contact detection signal input process on the forehead side in step S102. The contact detection signal input process on the forehead side in step S102 includes the processes of substeps 1 to 3 below.

Substep 1: Firstly, the controller 103 connects the chin strap contact detection sensor 120 to GND (that is, the minus side of the power supply 107). Specifically, the controller 103 connects, to GND, an input port of a microcomputer IC into which a contact detection signal of the chin strap contact detection sensor 120 is inputted.

Substep 2: Next, the controller 103 receives input of a contact detection signal from the headband contact detection sensor 110. More specifically, the controller 103 turns on an output port of the microcomputer IC and applies a voltage to the headband contact detection sensor 110. Furthermore, the controller 103 measures the time taken to turn on the input port, that is, the time taken for the capacitance to reach a predetermined amount.

Substep 3: Next, the controller 103 stores the time taken to turn on, which was measured in substep 2 above, and suspends the application of a voltage to the headband contact detection sensor 110. Furthermore, the controller 103 disconnects, from GND, the input port of the microcomputer IC into which the contact detection signal of the chin strap contact detection sensor 120 is inputted. The contact detection signal input process on the forehead side may be executed once to acquire one measurement value, or can also be executed more than once to acquire a plurality of measurement values.

Next, the controller 103 executes a contact detection signal input process on the chin side in step S104. The contact detection signal input process on the chin side in step S104 includes the processes of substeps 1 to 3 below as in the contact detection signal input process on the forehead side.

Substep 1: Firstly, the controller 103 connects the headband contact detection sensor 110 to GND (that is, the minus side of the power supply 107). Specifically, the controller 103 connects, to GND, an input port of the microcomputer IC into which a contact detection signal of the headband contact detection sensor 110 is inputted.

Substep 2: Next, the controller 103 receives input of a contact detection signal from the chin strap contact detection sensor 120. More specifically, the controller 103 turns on an output port of the microcomputer IC and applies a voltage to the chin strap contact detection sensor 120. Furthermore, the controller 103 measures the time taken to turn on the input port, that is, the time taken for the capacitance to reach a predetermined amount.

Substep 3: Next, the controller 103 stores the time taken to turn on, which was measured in sub step 2 above, and suspends the application of a voltage to the chin strap contact detection sensor 120. Furthermore, the controller 103 disconnects, from GND, the input port of the microcomputer IC into which the contact detection signal of the headband contact detection sensor 110 is inputted. The contact detection signal input process on the chin side may be executed once to acquire one measurement value, or can also be executed more than once to acquire a plurality of measurement values.

Next, the controller 103 executes a wearing state determination process in step S106. The wearing state determination process is the process of determining whether or not the helmet 90 is appropriately worn on the head of the user U. Specifically, the controller 103 including the wearing determiner 103a checks to see whether or not both of the measurement value acquired in step S102 above and the measurement value acquired in step S104 above exceed a predetermined threshold. If both of the two measurement values exceed the threshold, the controller 103 determines and stores it as a "worn state" where the helmet 90 is appropriately worn on the head of the user U.

On the other hand, if at least one of the measurement value acquired in step S102 above and the measurement value acquired in step S104 above does not exceed the threshold in the wearing state determination process in step S106, the controller 103 determines and stores it as a "not-worn state" where the helmet 90 is not worn appropriately on the head of the user U.

In the wearing state determination process in step S106, the predetermined threshold being the comparison target of the measurement value acquired in step S102 above and the measurement value acquired in step S104 above is prestored in the controller 103 in the stage of manufacturing the personal protective equipment wearing detection apparatus 100. Moreover, in terms of the predetermined threshold, the same threshold is used for the measurement value on the headband contact detection sensor 110 side and the measurement value on the chin strap contact detection sensor 120 side in the embodiment. It is also possible to use different thresholds for the measurement value on the headband contact detection sensor 110 side and the measurement value on the chin strap contact detection sensor 120 side, respectively.

For example, in terms of the predetermined thresholds, a threshold for a comparison with the measurement value on the chin strap contact detection sensor 120 side is set to a higher value (a value on a strict condition) than a threshold for a comparison with the measurement value on the headband contact detection sensor 110 side, which encourages the user U to make more sure to fasten the chin strap 94.

Next, the controller 103 executes a state change determination process in step S108. The state change determination process is the process of determining whether or not the determination result by the wearing state determination process in step S106 above and a determination result stored in the determination result storage 103b are the same. Specifically, the controller 103 determines whether or not the determination result by the wearing state determination process in step S106 above and the determination result stored in the determination result storage 103b are the same. If both determination results are the same, the controller 103 determines it as "No" where the state remains unchanged, and proceeds to step S116.

On the other hand, if the determination result by the wearing state determination process in step S106 above and the determination result stored in the determination result storage 103b are different from each other in the state change determination process in step S108, the controller 103 determines it as "Yes" where the state has changed, and proceeds to step S110. A determination result of the "not-worn state" is stored as an initial value in the determination result storage 103b in an unillustrated step at the start of the execution of the personal protective equipment wearing detection program.

Next, in step S110, the controller 103 stores, in the determination result storage 103b, the determination result by the wearing state determination process in step S106 above. In other words, the controller 103 rewrites the determination result stored in the determination result storage 103b if having determined that the wearing state of the helmet 90 has changed in the state change determination process in step S108 above. Specifically, the controller 103 stores a determination result being the "worn state" if a determination result being the "not-worn state" is stored in the determination result storage 103b, and stores a determination result being the "not-worn state" if a determination result being the "worn state" is stored.

Next, the controller 103 executes a wearing state transmission process in step S112. The wearing state transmission process is the process of transmitting, to the host apparatus 200, the latest determination result stored in the determination result storage 103b in step S110 above. Specifically, the controller 103 transmits the "worn state" or "not-worn state," which is the latest determination result stored in the determination result storage 103b in step S110 above, to the host apparatus 200 via the transmitter-receiver 104.

Consequently, the host apparatus 200 receives the detection result signal transmitted from the detection apparatus body 101, and executes the processes of monitoring and storing the wearing state indicating whether or not the helmet 90 is worn, and notifying the manager of the wearing state. The processes by the host apparatus 200 are not related directly to the present invention; therefore, a description thereof is omitted.

Next, the controller 103 executes a time count process in step S114. The time count process is the process of measuring output elapsed time being the time elapsed since the transmission of the detection result signal to the host apparatus 200. Specifically, the controller 103 starts counting the time with an internal timer.

On the other hand, if having determined that the wearing state of the helmet 90 remains unchanged in the state change determination process in step S108 above, the controller 103 executes a predetermined time passage determination process in step S116. The predetermined time passage determination process is the process where the controller 103 determines whether or not a predetermined period of time has passed since the most recent transmission of the wearing state of the helmet 90 to the host apparatus 200.

Specifically, the controller 103 checks to see whether or not the output elapsed time being the elapsed time since the start of the execution of the time count process in step S114 above has reached the predetermined period of time. If the time count value has reached the predetermined period of time, the controller 103 determines it as "Yes," and proceeds to step S112. In other words, even if the wearing state of the helmet 90 has not changed, when the predetermined period of time has passed since the transmission of the wearing state of the helmet 90 to the host apparatus 200, the controller 103 transmits the latest determination result stored in the determination result storage 103b to the host apparatus 200 via the transmitter-receiver 104 in step S112. In the embodiment, the predetermined period of time is five minutes. The predetermined period of time is simply required to be set as appropriate.

Consequently, the controller 103 can cause the host apparatus 200 to confirm that the wearing state continues to be appropriately determined even if a determination result is not outputted to the host apparatus 200 for more than the predetermined period of time. Moreover, the controller 103 can cause the host apparatus 200 to confirm that the controller 103 is present within a coverage area. The controller 103 then executes the time count process in step S114.

On the other hand, if the time elapsed since the start of the execution of the time count process in step S114 has not reached the predetermined period of time, the controller 103 determines it as "No," and proceeds to step S118.

Next, the controller 103 executes a sleep process in step S118. The sleep process is the process of pausing the running state of the controller 103 for a predetermined period of time. Specifically, the controller 103 executes a sleep mode for the predetermined period of time. In sleep mode, the controller 103 suspends the execution of an instruction while putting the peripheral functions (such as a power monitoring function and a random number generating function) of the CPU in an executable state. In the embodiment, the predetermined period of time is two seconds. The predetermined period of time is simply required to be set as appropriate.

Consequently, the controller 103 can reduce the frequency of the execution of each process of the personal protective equipment wearing detection program and reduce power consumption. Moreover, examples of the sleep process include a low-speed operation mode that reduces the operating frequency of the CPU, and a low-speed operation sleep mode that reduces the operating frequency of the peripheral function in the sleep mode state, in addition to the sleep mode.

The controller 103, which has returned from the sleep process in step S118, returns to step S102, and executes the contact detection signal input process on the forehead side. In other words, the controller 103 executes each process of steps S102 to S118 of the personal protective equipment wearing detection program repeatedly and endlessly as long as power continues to be supplied from the power supply 107. Consequently, the controller 103 and the host apparatus 200 can continually monitor whether or not the user U is wearing the helmet 90 appropriately.

If the battery mounted in the detection apparatus body 101 is exhausted during the use of the helmet 90, the user U can replace the battery. Specifically, the user U disconnects the contact detection signal wires 114 and 124 from the second signal wire connectors 115 and 125 and, accordingly, can separate the detection apparatus body 101 from the headband contact detection sensor 110 and the chin strap contact detection sensor 120. Consequently, the user U can remove the detection apparatus body 101 from the hat body 91 to replace the battery while the headband contact detection sensor 110 and the chin strap contact detection sensor 120 are attached to the helmet 90.

In the battery replacement work, the controller 103 suspends the execution of the personal protective equipment wearing detection program when the battery is removed from the power supply 107. The battery is mounted on the power supply 107 and power is supplied to the controller 103; accordingly, the personal protective equipment wearing detection program is executed automatically.

Next, when stopping using the helmet 90, the user U takes off the helmet 90. Specifically, the user U loosens the chin strap 94 and takes the hat body 91 off his/her head. In this case, the user U can store the helmet 90 in a state where the personal protective equipment wearing detection apparatus 100 is attached to the helmet 90. The controller 103 continues executing the personal protective equipment wearing detection program during the storage of the helmet 90. Hence, the controller 103 can detect the wearing state any time the user U puts on the helmet 90.

In this case, the user U can also remove the personal protective equipment wearing detection apparatus 100 from the helmet 90. Specifically, the user U unfolds the fabric mounting bodies 111 and 121 formed into tubes and removes them from the headband 92 and the chin strap 94, and also removes the detection apparatus body 101 from the hat body 91. Consequently, the user U can remove the personal protective equipment wearing detection apparatus 100 from the helmet 90 and then stores the personal protective equipment wearing detection apparatus 100.

As can be understood from the above operation description, according to the above embodiment, in the personal protective equipment wearing detection apparatus 100, while one of the two contact detection sensors, the headband contact detection sensor 110 and the chin strap contact detection sensor 120, outputs a contact detection signal to the controller 103, the controller 103 connects the other contact detection sensor to GND. Hence, the contact detection signal to be inputted into the controller 103 can be stabilized; accordingly, the accuracy of detecting the approach or contact of the head of the user U can be improved.

Furthermore, upon carrying out the present invention, the present invention is not limited to the above embodiment, and can be modified in various manners without departing from the object of the present invention. In the description of each modification, the same reference signs are assigned to parts similar to the above embodiment, and overlapping descriptions are omitted.

For example, in the above embodiment, the headband contact detection sensor 110 is configured in such a manner as to be wrapped around and in intimate contact with the perimeter of the headband 92. In other words, the fabric mounting body 111 is formed in such a manner that the length of a portion without the tubular connector 112, that is, the length of the fabric mounting body 111 between the two attachment portions of the tubular connectors 112, is substantially equal to the length of the perimeter of the headband 92 (the length of the headband 92 in a direction to wrap the fabric mounting body 111 around the headband 92). Consequently, in the headband contact detection sensor 110, the fabric mounting body 111 faces the head of the user U at the same position as the position where the headband 92 faces the head of the user U with substantially the same area as the area where the headband 92 faces the head of the user U. However, the headband contact detection sensor 110 is simply required to be configured in such a manner as to be wrapped around and attached to the perimeter of a worn component such as the headband 92.

Figure 8:
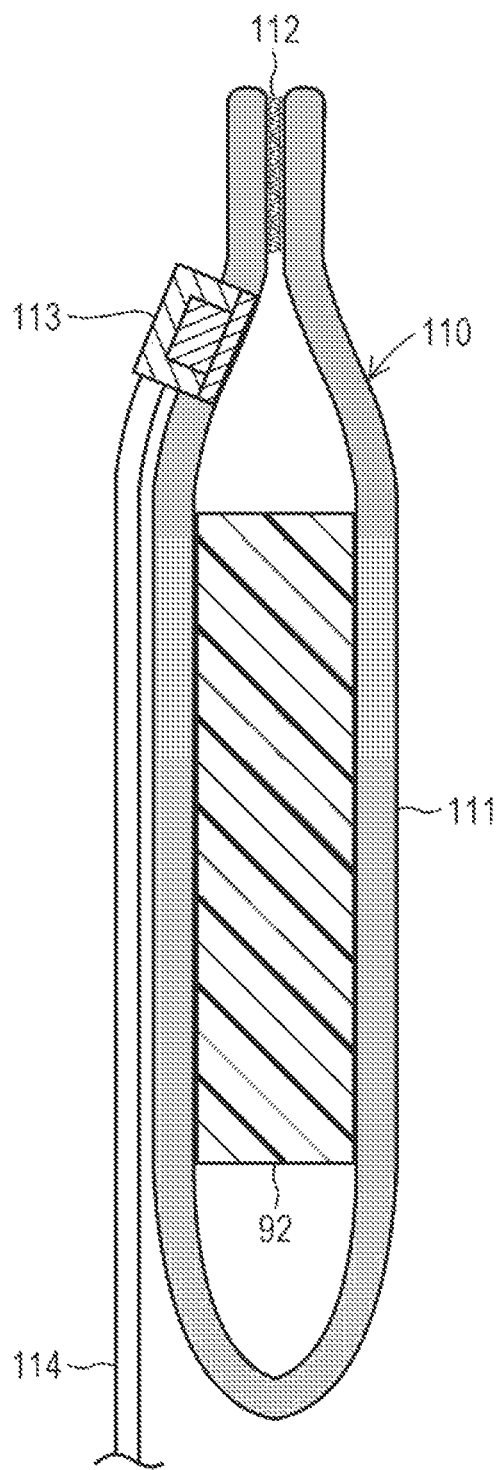
FIG. 8 is a main part cross-sectional view illustrating a state where the headband contact detection sensor according to another modification of the present invention has been formed into a tube and wrapped around the headband.

Therefore, for example, the length of the fabric mounting body 111 between the two tubular connectors 112 can be formed in such a manner as to be sufficiently longer than the length of the perimeter of the headband 92 in the headband contact detection sensor 110 as illustrated in FIG. 8. Consequently, when the fabric mounting body 111 of the headband contact detection sensor 110 is attached to the headband 92, the fabric mounting body 111 faces the head, jutting out in a direction orthogonal to the longitudinal direction of the headband 92 (the vertical direction of the head), and the contact area of the fabric mounting body 111 with the head is increased. Hence, the wearing state of the helmet 90 can be accurately detected.

The length of the fabric mounting body 111 between the two tubular connectors 112 is not particularly limited. The length is preferably within a range between equal to or greater than 1.5 times and equal to or less than three times the length of the perimeter of the headband 92. Moreover, if a conductive portion is formed in a part of the fabric mounting body 111, the length of the fabric mounting body 111 between the two tubular connectors 112 is the length of the conductive portion in the length direction. Moreover, naturally, in terms of the chin strap contact detection sensor 120, the length of the fabric mounting body 121 between the two tubular connectors 122 can also be formed in such a manner as to be sufficiently longer than the length of the perimeter of the chin strap 94 as in the headband contact detection sensor 110. Moreover, in FIG. 8, the right side to the headband 92 in the illustration is the head side of the user U.

Moreover, in the above embodiment, the personal protective equipment wearing detection apparatus 100 is configured, including the headband contact detection sensor 110 and the chin strap contact detection sensor 120. In other words, the headband contact detection sensor 110 and the chin strap contact detection sensor 120 correspond to contact detection sensors according to the present invention.

However, the personal protective equipment wearing detection apparatus 100 is simply required to include a plurality of, two or more, contact detection sensors that are attached to the helmet 90. Therefore, the personal protective equipment wearing detection apparatus 100 can also be configured, including three or more contact detection sensors. In this case, the personal protective equipment wearing detection apparatus 100 can also be configured, including a contact detection sensor that is attached to a place on the headband 92 other than the portion facing the forehead of the user U, for example, a portion facing the back or side of the head.

Figure 9:
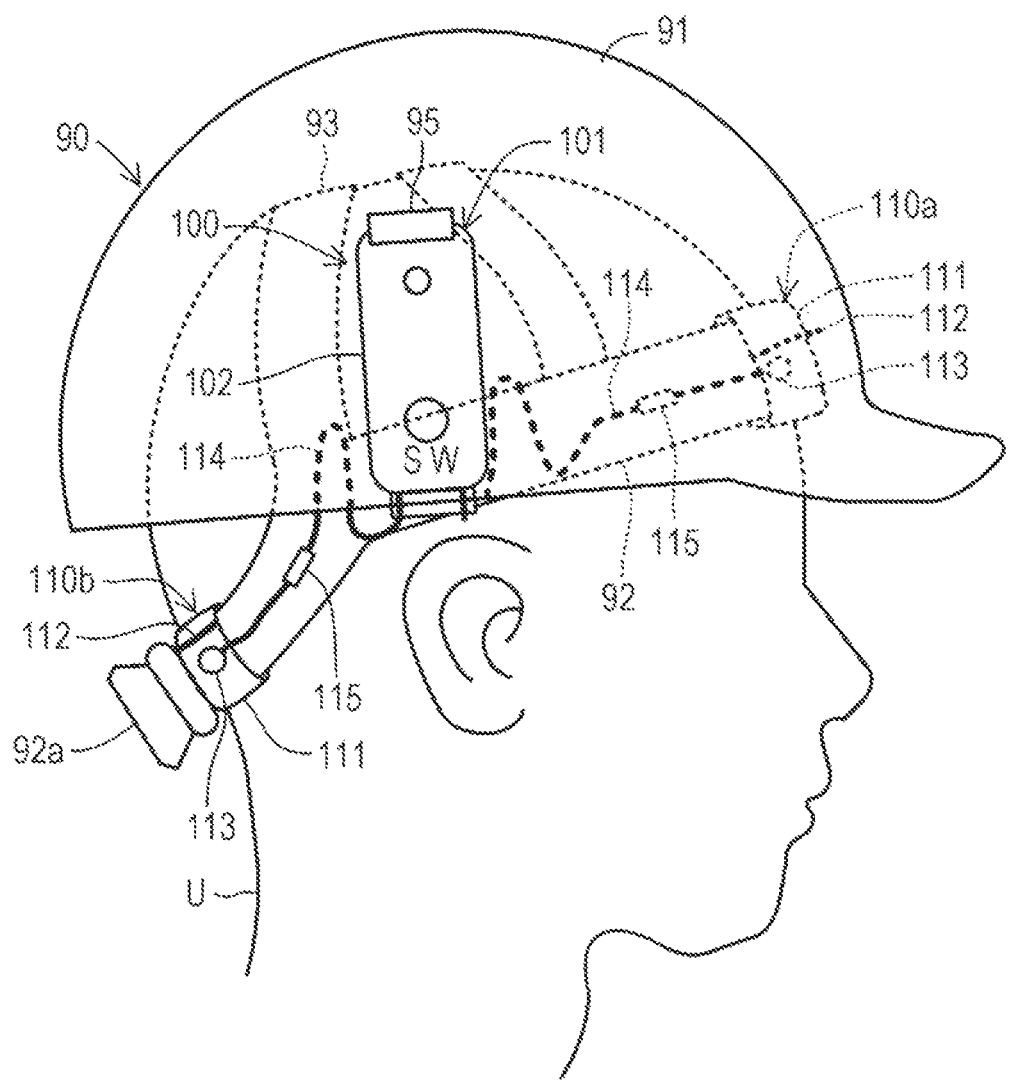
FIG. 9 is a side view schematically illustrating a state where the personal protective equipment wearing detection apparatus according to another modification of the present invention is mounted on each of the front and back parts of the headband.

In these cases, for example, as illustrated in FIG. 9, the personal protective equipment wearing detection apparatus 100 can be mounted on the helmet 90 without the chin strap 94 but including an adjustment knob 92a for adjusting the fit of the headband 92 from the back of the head of the user U. Specifically, the personal protective equipment wearing detection apparatus 100 includes two headband contact detection sensors 110a and 110b. One headband contact detection sensor 110a can be attached to the portion, which faces the forehead of the user U, of the headband 92. The other headband contact detection sensor 110b can be attached to the portion, which faces the back of the head of the user U, of the headband 92 (near the adjustment knob 92a). Accordingly, in the personal protective equipment wearing detection apparatus 100, the two headband contact detection sensors 110a and 110b can be securely and firmly brought into intimate contact with the head by tightening the headband 92.

Figure 10:
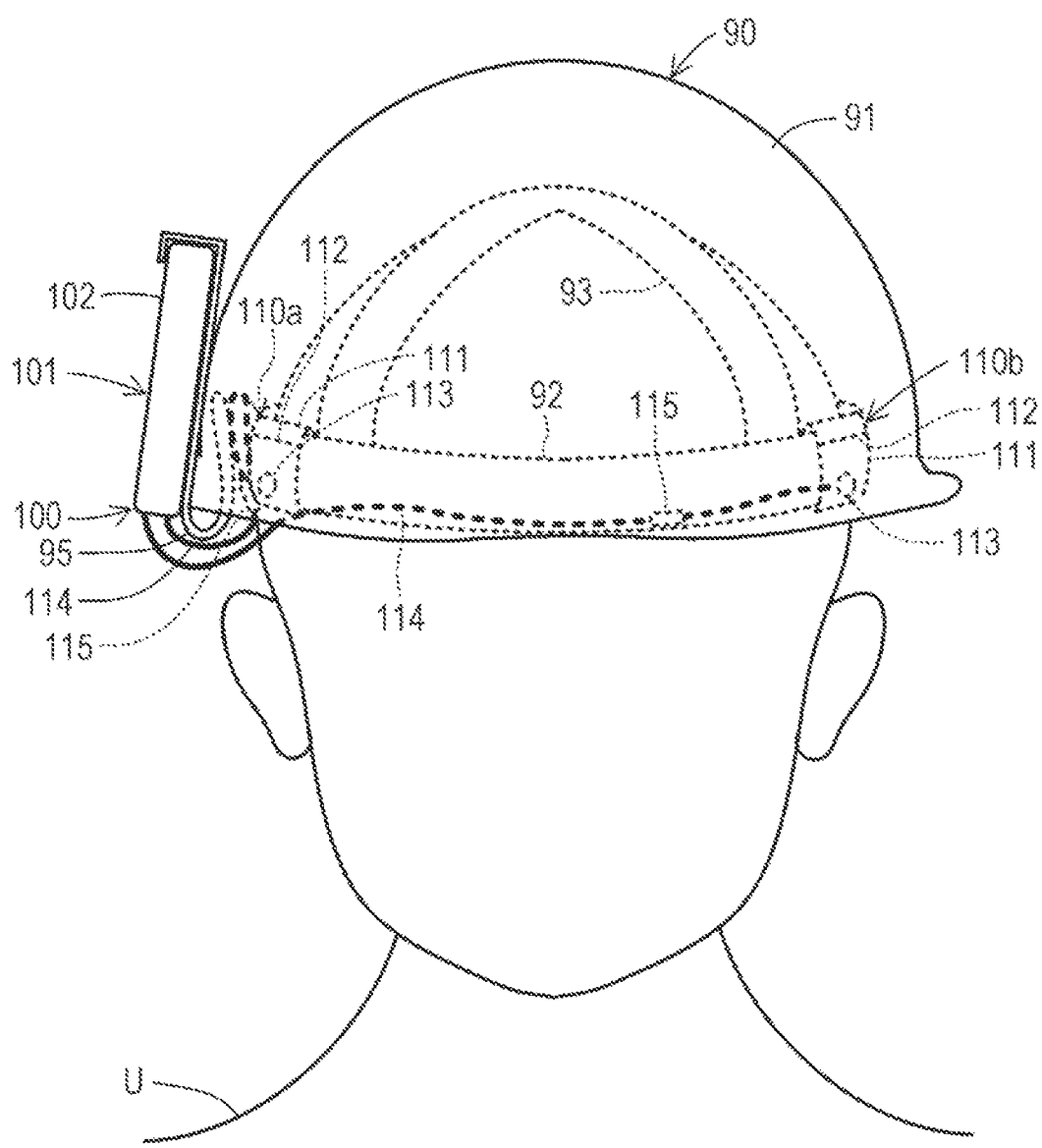
FIG. 10 is a front view schematically illustrating a state where the personal protective equipment wearing detection apparatus according to another modification of the present invention is mounted on each of the left and right parts of the headband.
Figure 11:
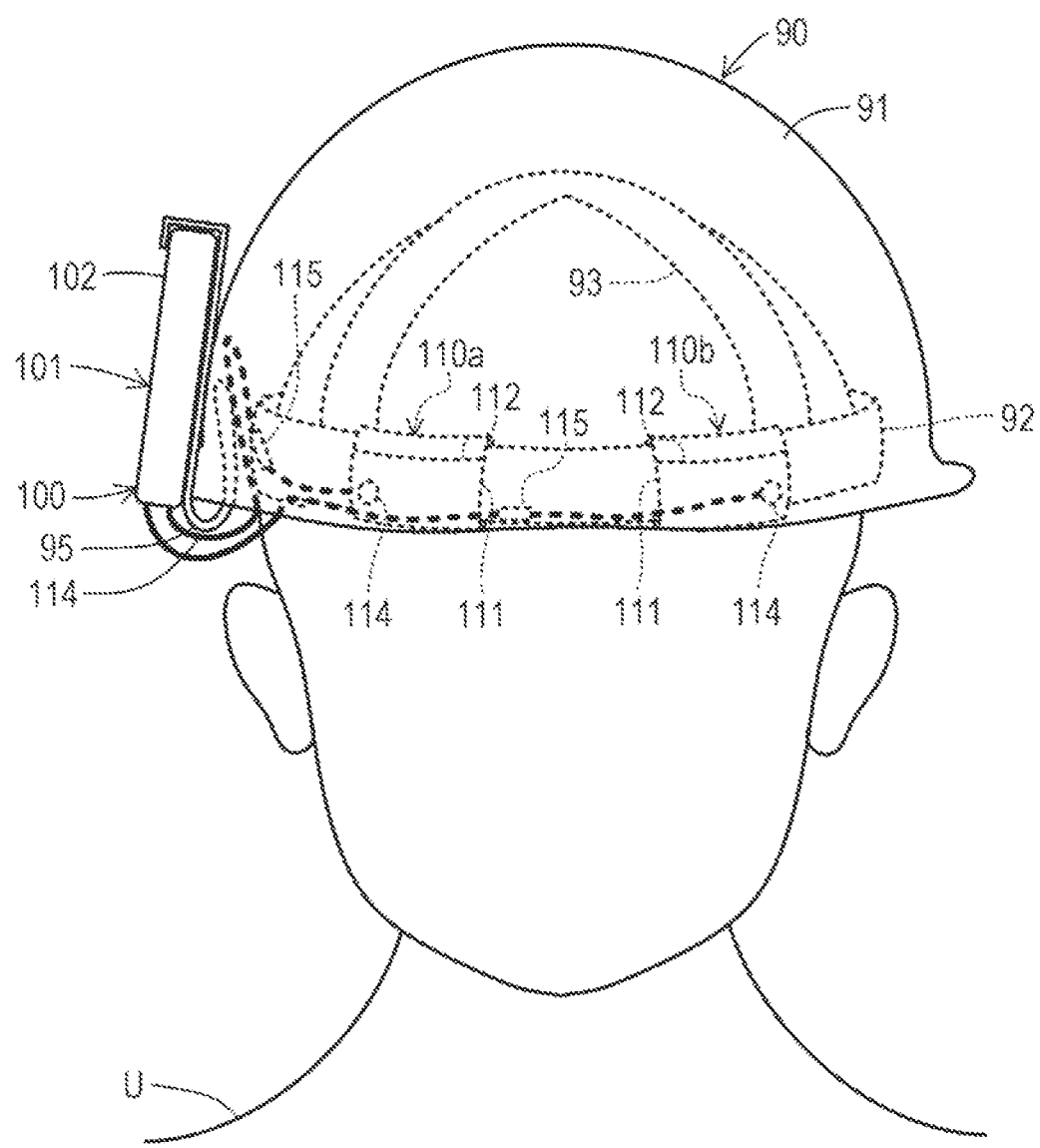
FIG. 11 is a front view schematically illustrating a state where the personal protective equipment wearing detection apparatus according to another modification of the present invention is mounted on each of two positions on the front part of the headband.

Moreover, in the personal protective equipment wearing detection apparatus 100, the two headband contact detection sensors 110a and 110b can be attached to portions, which face the left and right sides of the head of the user U, of the headband 92, respectively, as illustrated in FIG. 10. Moreover, in the personal protective equipment wearing detection apparatus 100, the two headband contact detection sensors 110a and 110b can be attached to portions, which face the left and right side portions of the forehead of the user U, of the headband 92, respectively, as illustrated in FIG. 11. Naturally, it may be configured in such a manner that the number of the headband contact detection sensors 110 is three or more.

In other words, the personal protective equipment wearing detection apparatus 100 can be configured, including a plurality of the headband contact detection sensors 110 that are mounted at a plurality of positions on the headband 92. The personal protective equipment wearing detection apparatus 100 can also include a plurality of (two or more) the chin strap contact detection sensors 120 (not illustrated), and be attached at a plurality of positions on the chin strap 94. Moreover, the personal protective equipment wearing detection apparatus 100 can also be configured, including a contact detection sensor that is attached to the hammock 93, the contact detection sensor being attached to a portion facing the top of the head of the user U or a surrounding area thereof.

Moreover, the contact detection sensors including the headband contact detection sensor 110 and the chin strap contact detection sensor 120 are simply required to be configured in such a manner as to be attached at any positions on the helmet 90, for example, the hat body 91, the headband 92, the hammock 93, and the chin strap 94. These contact detection sensors are not necessarily required to include the fabric mounting bodies 111 and 121 that are wrapped around the headband 92 and the chin strap 94. In other words, the contact detection sensor may be attached to each portion of the helmet 90 by a double-sided tape, an adhesive, or seaming.

Moreover, in the above embodiment, the personal protective equipment wearing detection apparatus 100 is configured in such a manner to perform switching control that connects, to GND, a contact detection sensor on a side that does not input a contact detection signal out of the two contact detection sensors, the headband contact detection sensor 110 and the chin strap contact detection sensor 120. However, the personal protective equipment wearing detection apparatus 100 is simply required that while one of the plurality of contact detection sensors outputs a contact detection signal to the controller 103, the remaining contact detection sensor is connected to GND. Therefore, in the personal protective equipment wearing detection apparatus 100, it is also possible to stabilize the contact detection signal to be inputted into the controller 103 by providing a pull-down resistor (not illustrated) between the contact detection sensor and GND, instead of, or in addition to, control of switching to GND by the controller 103.

In this case, for example, if in the personal protective equipment wearing detection apparatus 100, a pull-down resistor is provided for example, between each of the contact detection sensors, the headband contact detection sensor 110 and the chin strap contact detection sensor 120, and GND, the headband contact detection sensor 110 and the chin strap contact detection sensor 120 are always in the state of being connected to GND. Therefore, the controller 103 is simply required to omit substep 1 and start execution in substep 2 in the contact detection signal input process on the forehead side in step S102 above and the contact detection signal input process on the chin side in step S104 above.

Moreover, the personal protective equipment wearing detection apparatus 100 can also be configured in such a manner that the controller 103 always connects the input ports for the headband contact detection sensor 110 and the chin strap contact detection sensor 120 to GND. In this case, the controller 103 executes the process of connecting, to GND, the input ports for the headband contact detection sensor 110 and the chin strap contact detection sensor 120 in step S101 immediately after the start of the execution of the personal protective equipment wearing detection program as indicated by broken lines in FIG. 7.

In the contact detection signal input process on the forehead side in step S102 above, the controller 103 then interrupts the connection of the input port for the headband contact detection sensor 110 to GND, inputs a contact detection signal, and then restores the connection to GND. Moreover, in the contact detection signal input process on the chin side in step S104 above, the controller 103 interrupts the connection of the input port for the chin strap contact detection sensor 120 to GND, inputs a contact detection signal, and then restores the connection to GND. Accordingly, it is also possible to omit substep 1 in the contact detection signal input process on the forehead side in step S102 above and the contact detection signal input process on the chin side in step S104 above in the personal protective equipment wearing detection apparatus 100.

Moreover, in the above embodiment, when both of the measurement value based on the detection of the headband contact detection sensor 110 and the measurement value based on the detection of the chin strap contact detection sensor 120 exceed the predetermined threshold in the wearing state determination process in step S106, the controller 103 determines it as the "worn state" corresponding to the appropriate wearing on the head of the user U. However, when one of the measurement value based on the detection of the headband contact detection sensor 110 and the measurement value based on the detection of the chin strap contact detection sensor 120 exceeds the predetermined threshold in the wearing state determination process in step S106, the controller 103 can also determine it as the "worn state" corresponding to the appropriate wearing on the head of the user U. Moreover, if there are three or more contact detection sensors, when measurement values of two or more, or all the contact detection sensors exceed the predetermined threshold, the controller 103 can also determine it as the "worn state" corresponding to the appropriate wearing on the head of the user U.

In this manner, if in the personal protective equipment wearing detection apparatus 100, the wearing determiner 103a is configured in such a manner to, when two or more of the plurality of contact detection sensors have detected the worn state of the helmet 90 on the head, determine that the helmet 90 is worn on the head, it is possible to detect the worn state itself of the helmet 90 without the configuration where while one of the plurality of contact detection sensors outputs a contact detection signal to the controller 103, the remaining contact detection sensor is connected to GND.

Moreover, in the above embodiment, the personal protective equipment wearing detection apparatus 100 is configured in such a manner that the controller 103 executes the processes after the wearing state determination process in step S106. In other words, the personal protective equipment wearing detection apparatus 100 is configured in such a manner that the controller 103 includes the wearing determiner 103a and the determination result storage 103b, and determines the worn state or not-worn state of the helmet 90 and transmits a detection result signal to the host apparatus 200. However, the personal protective equipment wearing detection apparatus 100 may be configured in such a manner that the controller 103 transmits, to the host apparatus 200, contact detection signals outputted from the headband contact detection sensor 110 and the chin strap contact detection sensor 120, and that the host apparatus 200 determines the worn state or not-worn state of the helmet 90. In other words, the host apparatus 200 can include the wearing determiner 103a and the determination result storage 103b and determine the worn state or not-worn state of the helmet 90.

Moreover, the personal protective equipment wearing detection apparatus 100 may be configured in such a manner to, when the controller 103 has determined the worn state or not-worn state of the helmet 90, output the determination result to its own output 106 without transmitting a detection result signal to the host apparatus 200. In this case, the output 106 can directly notify the wearer of the helmet 90 by use of a configuration such as the blink of light by a light-emitting device such as an LED, the production of sound by a sound producing device such as a speaker, or vibrations caused by a vibrator that rotates an unbalanced mass by use of a motor. In other words, the personal protective equipment wearing detection apparatus 100 can be configured, omitting the host apparatus 200.

Moreover, in the above embodiment, the controller 103 is configured in such a manner as to, if the wearing state of the helmet 90 has changed in the state change determination process in step S108, transmit a detection result signal to the host apparatus 200. However, it is also possible to carry out a configuration where the state change determination process in step S108 is omitted and a detection result signal is transmitted to the host apparatus 200 whenever the wearing state determination process in step S106 is executed.

Moreover, in the above embodiment, the controller 103 is configured in such a manner as to, when the output elapsed time has reached the predetermined period of time in the predetermined time passage determination process in step S116, transmit a detection result signal to the host apparatus 200. However, the controller 103 can also be configured in such a manner as to omit the execution of the predetermined time passage determination process in step S116.

Moreover, in the above embodiment, the personal protective equipment wearing detection apparatus 100 is configured in such a manner that the controller 103 executes the personal protective equipment wearing detection program automatically by mounting the battery on the power supply 107. In other words, in the personal protective equipment wearing detection apparatus 100, the controller 103 executes the determination process by the wearing determiner 103a automatically, triggered by the supply of power from the power supply 107. Hence, it is possible to prevent failing to detect the wearing state of the helmet 90 due to forgetting turning on a power switch of the personal protective equipment wearing detection apparatus 100. However, the personal protective equipment wearing detection apparatus 100 can also be configured in such a manner as to supply the power of the power supply 107 to the controller 103 by providing the power switch. Consequently, the personal protective equipment wearing detection apparatus 100 can reduce the power consumption of the power supply 107 by turning off the power switch if not used, for example, during storage.

Moreover, in the above embodiment, the tubular connectors 112 and 122 are configured in such a manner as to freely attach and separate both end portions of each of the fabric mounting bodies 111 and 121 formed into tubes to and from each other by each being configured with a hook-and-loop fastener. However, the tubular connectors 112 and 122 are simply required to be capable of fastening together the opposing portions of each of the fabric mounting bodies 111 and 121 formed into tubes, and can each be configured with a button (which includes a buttonhole), hook, or zipper other than a hook-and-loop fastener.

Moreover, the tubular connectors 112 and 122 may be configured in such a manner as to connect, by seaming, the opposing portions of each of the fabric mounting bodies 111 and 121 formed into tubes, where the headband 92 and the chin strap 94 penetrate. Alternatively, the tubular connectors 112 and 122 can also be configured in such a manner as to connect the ends by bonding. In other words, the tubular connectors 112 and 122 can join and fix the opposing portions of each of the fabric mounting bodies 111 and 121 formed into tubes. In this case, they can also be provided, fixed, by being sewn on or bonded to the fabric mounting bodies 111 and 121.

Moreover, in the above embodiment, the tubular connectors 112 and 122 are configured in such a manner as to be provided on the inner surfaces of the fabric mounting bodies 111 and 121 in the tubular form, respectively, and protrude outward when both end portions of each of the fabric mounting bodies 111 and 121 are affixed together. Consequently, the tubular connectors 112 and 122 can prevent the fabric mounting bodies 111 and 121 from being displaced when the fabric mounting bodies 111 and 121 are mounted on the headband 92 and the chin strap 94. In other words, the two attachment portions of each of the tubular connectors 112 and 122 are provided on the same surface of each of the fabric mounting bodies 111 and 121, respectively.

However, the two attachment portions of each of the tubular connectors 112 and 122 can also be provided on opposite surfaces of each of the fabric mounting bodies 111 and 121, respectively. Consequently, the tubular connectors 112 and 122 allow affixing one (the inner surface) of both ends of each of the fabric mounting bodies 111 and 121 in the tubular form on the other end (outer surface); accordingly, it is possible to prevent the tubular connectors 112 and 122 from protruding outward. Moreover, the tubular connectors 112 and 122 can be provided at both ends of each of the fabric mounting bodies 111 and 121 formed into tubes, respectively, if the tubular connectors 112 and 122 are each configured with a zipper.

Moreover, in the above embodiment, the first signal wire connectors 113 and 123 are each configured with a snap fastener. However, the first signal wire connectors 113 and 123 are simply required to be configured in such a manner as to electrically and physically connect or disconnect the fabric mounting bodies 111 and 121 and the contact detection signal wires 114 and 124. Therefore, the first signal wire connectors 113 and 123 can each be configured with a terminal other than a snap fastener, for example, a plug-in terminal such as a cable joint or connector.

Moreover, in the above embodiment, the first signal wire connectors 113 and 123 are provided on the surfaces, which are opposite to the surfaces provided with the tubular connectors 112 and 122, of the fabric mounting bodies 111 and 121, that is, the outer surfaces of the fabric mounting bodies 111 and 121 in the tubular form. Consequently, the first signal wire connectors 113 and 123 can easily disconnect or connect the fabric mounting bodies 111 and 121 in a state where the fabric mounting bodies 111 and 121 are mounted on the chin strap 94 and the headband 92. However, the first signal wire connectors 113 and 123 can also be provided on the surfaces, which are provided with the tubular connectors 112 and 122, of the fabric mounting bodies 111 and 121, that is, the inner surfaces of the fabric mounting bodies 111 and 121 in the tubular form. Consequently, the first signal wire connectors 113 and 123 are placed inside the tubes of the fabric mounting bodies 111 and 121 in the tubular form. Hence, it is possible to prevent smudges during the use of the helmet 90.

Moreover, it is also possible to omit the first signal wire connectors 113 and 123 if it is not necessary to electrically and physically connect or disconnect the fabric mounting bodies 111 and 121 and the contact detection signal wires 114 and 124.

Moreover, in the above embodiment, the second signal wire connectors 115 and 125 are each configured with a cable joint. However, the second signal wire connectors 115 and 125 are simply required to be configured in such a manner as to be capable of electrically and physically connecting or disconnecting the contact detection signal wires 114 and 124 themselves at some points in each of the entire contact detection signal wires 114 and 124. Therefore, the second signal wire connectors 115 and 125 can each be configured with a snap fastener terminal, in addition to a plug-in terminal such as a connector, other than a cable joint.

The second signal wire connectors 115 and 125 are configured with the same connection terminals as the first signal wire connectors 113 and 123. Accordingly, it is also possible to connect the second signal wire connectors 115 and 125 and the first signal wire connectors 113 and 123.

Moreover, in the above embodiment, the second signal wire connectors 115 and 125 are provided at the positions where, in the lengths of the entire contact detection signal wires 114 and 124, the lengths on the controller 103 side are greater than the lengths on the fabric mounting bodies 111 and 121 sides. Consequently, in the personal protective equipment wearing detection apparatus 100, when the contact detection signal wires 114 and 124 are disconnected while the user U is wearing the helmet 90, the lengths of the contact detection signal wires 114 and 124 extending from the fabric mounting bodies 111 and 121 become shorter. Hence, the amounts of hanging down of the contact detection signal wires 114 and 124 from the head of the user U are reduced, which can make the user U less uncomfortable.

However, the second signal wire connectors 115 and 125 can also be provided to the center portions in the lengths of the entire contact detection signal wires 114 and 124. Moreover, the second signal wire connectors 115 and 125 can also be provided at positions where, in the lengths of the entire contact detection signal wires 114 and 124, the lengths on the controller 103 side are less than the lengths on the fabric mounting bodies 111 and 121 sides. Consequently, in the personal protective equipment wearing detection apparatus 100, it is possible to extend the range of the length adjustment for the contact detection signal wires 114 and 124 by offering various lengths for the contact detection signal wires 114 and 124 on the fabric mounting bodies 111 and 121 sides. Moreover, it is also possible to omit the second signal wire connectors 115 and 125 if it is not necessary to electrically and physically connect or disconnect the contact detection signal wires 114 and 124 at some points in each of the entire contact detection signal wires 114 and 124.

Moreover, in the above embodiment, the personal protective equipment wearing detection apparatus 100 is configured in such a manner as to connect the fabric mounting bodies 111 and 121 of the headband contact detection sensor 110 and the chin strap contact detection sensor 120 to the controller 103 with the wired contact detection signal wires 114 and 124. However, the personal protective equipment wearing detection apparatus 100 can also be configured in such a manner as to wirelessly connect the fabric mounting bodies 111 and 121 of the headband contact detection sensor 110 and the chin strap contact detection sensor 120 to the controller 103.

Moreover, in the above embodiment, the personal protective equipment wearing detection apparatus 100 is mounted on the safety helmet. In other words, the personal protective equipment wearing detection apparatus 100 is configured as a helmet wearing detection apparatus. However, the personal protective equipment wearing detection apparatus 100 can also be mounted on various helmets other than safety helmets, for example, helmets for athletics such as sports, or play, in addition to helmets for vehicles such as bicycles and motorcycles.

Moreover, the personal protective equipment wearing detection apparatus 100 according to the present invention can be widely applied as a wearing detection apparatus for personal protective equipment that is worn on and protect a person's body. In this case, examples of personal protective equipment include safety shoes, protective glasses, protective masks, and protective gloves. Moreover, examples of personal protective equipment include protectors that are worn on the neck, trunk, waist, arms and legs, and feet of a person.

LIST OF REFERENCE SIGNS

U User
90 Helmet

91 Hat body
92 Headband
92a Adjustment knob
93 Hammock
94 Chin strap
95 Fixture
100 Personal protective equipment wearing detection apparatus
101 Detection apparatus body
102 Housing
103 Controller
103a Wearing determiner
103b Determination result storage
104 Transmitter-receiver
105 Operating device
106 Output
107 Power supply
110, 110a, 110b Headband contact detection sensor
111 Fabric mounting body
112 Tubular connector
113 First signal wire connector
114 Contact detection signal wire
115 Second signal wire connector
120 Chin strap contact detection sensor
121 Fabric mounting body
122 Tubular connector
123 First signal wire connector
124 Contact detection signal wire
125 Second signal wire connector
200 Host apparatus

The invention claimed is:

1. A personal protective equipment wearing detection apparatus that is attached to personal protective equipment to be mounted on and protect a person's body and detects a wearing state of the personal protective equipment on the body, the personal protective equipment wearing detection apparatus comprising:
a plurality of contact detection sensors to be attached at a plurality of different positions on the personal protective equipment, the plurality of contact detection sensors being configured to output contact detection signals being electrical signals in accordance with the approach or contact of the body; and
a controller connected to the plurality of contact detection sensors, into which the contact detection signals are inputted, wherein
in the plurality of contact detection sensors, while one of the plurality of contact detection sensors outputs the contact detection signal to the controller, the remaining contact detection sensors are connected to ground.

2. The personal protective equipment wearing detection apparatus according to claim 1, wherein while receiving input of the contact detection signal from one of the plurality of contact detection sensors, the controller connects the remaining contact detection sensors to the ground.

3. The personal protective equipment wearing detection apparatus according to claim 2, further comprising a wearing determiner configured to determine the wearing state of the personal protective equipment on the body by use of the contact detection signals inputted into the controller from the plurality of contact detection sensors, wherein the wearing determiner determines that the personal protective equipment is worn on the body upon two or more of the plurality of contact detection sensors having detected the worn state of the personal protective equipment on the body.

4. The personal protective equipment wearing detection apparatus according to claim 3, wherein
the personal protective equipment is a helmet, and
the plurality of contact detection sensors includes a chin strap contact detection sensor to be mounted on a chin strap of the helmet, and a headband contact detection sensor to be mounted on a headband of the helmet.

5. The personal protective equipment wearing detection apparatus according to claim 3, wherein
the personal protective equipment is a helmet, and
the plurality of contact detection sensors includes a plurality of headband contact detection sensors to be mounted at a plurality of positions on a headband of the helmet.

6. The personal protective equipment wearing detection apparatus according to claim 3, further comprising:
a determination result storage configured to store a determination result by the wearing determiner; and
a host apparatus provided at a place physically away from the wearing determiner, into which the determination result by the wearing determiner is inputted, wherein
the controller
includes the determination result storage and the wearing determiner, and
compares the determination result by the wearing determiner and a previous determination result stored in the determination result storage and, upon both of the determination results being different, outputs the determination result determined this time to the host apparatus.

7. The personal protective equipment wearing detection apparatus according to claim 6, wherein the controller
measures time elapsed since the transmission of the determination result to the host apparatus as output elapsed time, and
compares the determination result by the wearing determiner and the previous determination result stored in the determination result storage and, upon both of the determination results agreeing with each other and the output elapsed time reaching a predetermined period of time, outputs the determination result determined this time to the host apparatus.

8. The personal protective equipment wearing detection apparatus according to claim 3, wherein the controller enters and keeps a sleep state for a predetermined period of time whenever the wearing determiner performs the determination process once, or two or more times.

9. The personal protective equipment wearing detection apparatus according to claim 3, further comprising a power supply configured to supply power to the controller without via a power switch, wherein the controller executes the determination process by the wearing determiner automatically, triggered by the supply of the power from the power supply.

10. A personal protective equipment wearing detection apparatus that detects a wearing state of personal protective equipment on a person's body, the personal protective equipment being worn on and protecting the body, the personal protective equipment wearing detection apparatus comprising:
a plurality of contact detection sensors to be attached at a plurality of different positions on the personal protective equipment, the plurality of contact detection sensors being configured to output contact detection signals being electrical signals in accordance with the approach or contact of the body;
a controller connected to the plurality of contact detection sensors, into which the contact detection signals are inputted;

a wearing determiner configured to determine the wearing state of the personal protective equipment on the body by use of the contact detection signals inputted into the controller, a determination result storage configured to store a determination result by the wearing determiner; and a host apparatus provided at a place physically away from the wearing determiner, into which the determination result by the wearing determiner is inputted, wherein the wearing determiner determines that the personal protective equipment is worn on the body upon at least two of the plurality of contact detection sensors having detected the worn state of the personal protective equipment on the body, the controller
  includes the determination result storage and the wearing determiner, and
  compares the determination result by the wearing determiner and a previous determination result stored in the determination result storage and, upon both of the determination results being different, outputs the determination result determined this time to the host apparatus.

11. The personal protective equipment wearing detection apparatus according to claim 10, wherein
  the personal protective equipment is a helmet, and
  the plurality of contact detection sensors includes a chin strap contact detection sensor to be mounted on a chin strap of the helmet, and a headband contact detection sensor to be mounted on a headband of the helmet.

12. The personal protective equipment wearing detection apparatus according to claim 10, wherein
  the personal protective equipment is a helmet, and
  the plurality of contact detection sensors includes a plurality of headband contact detection sensors to be mounted at a plurality of positions on a headband of the helmet.

13. The personal protective equipment wearing detection apparatus according to claim 10, wherein the controller
  measures time elapsed since the transmission of the determination result to the host apparatus as output elapsed time, and
  compares the determination result by the wearing determiner and the previous determination result stored in the determination result storage and, upon both of the determination results agreeing with each other and the output elapsed time reaching a predetermined period of time, outputs the determination result determined this time to the host apparatus.

14. The personal protective equipment wearing detection apparatus according to claim 10, wherein the controller enters and keeps a sleep state for a predetermined period of time whenever the wearing determiner performs the determination process once, or two or more times.

15. The personal protective equipment wearing detection apparatus according to claim 10, further comprising a power supply configured to supply power to the controller without via a power switch, wherein the controller executes the determination process by the wearing determiner automatically, triggered by the supply of the power from the power supply.

* * * * *